(12) United States Patent
Botto et al.

(10) Patent No.: US 8,281,473 B2
(45) Date of Patent: Oct. 9, 2012

(54) WEARABLE SURFACE FOR A DEVICE CONFIGURED FOR MATERIAL COMMINUTION

(75) Inventors: Ivo Botto, Catasauqua, PA (US); Kranthi Peddeti, Whitehall, PA (US); Curtis Erwin Prothe, Greensburg, PA (US)

(73) Assignee: FLSmidth A/S (DK)

( * ) Notice: Subject to any disclaimer, the term of this patent is extended or adjusted under 35 U.S.C. 154(b) by 257 days.

(21) Appl. No.: 12/766,110

(22) Filed: Apr. 23, 2010

(65) Prior Publication Data
US 2011/0259983 A1 Oct. 27, 2011

(51) Int. Cl.
*B23P 17/00* (2006.01)
*B02C 13/28* (2006.01)

(52) U.S. Cl. ................................ 29/421.1; 241/191

(58) Field of Classification Search .............. 29/421.2, 29/428, 505, 507, 522.1; 241/191, 30, 206, 241/221; 72/362
See application file for complete search history.

(56) References Cited

U.S. PATENT DOCUMENTS

| | | |
|---|---|---|
| 252,755 A | 1/1882 | Gates |
| 1,225,061 A | 5/1917 | Schultz |
| 1,589,302 A | 6/1926 | Middelboe |
| 3,137,937 A | 6/1964 | Cowan et al. |
| 3,233,312 A | 2/1966 | Cowan et al. |
| 3,474,520 A | 10/1969 | Yu Takizawa et al. |
| 3,813,758 A | 6/1974 | Araki |
| 3,868,761 A | 3/1975 | Apalikov et al. |
| 3,900,147 A | 8/1975 | Apalikov et al. |
| 3,955,766 A | 5/1976 | Chang |
| 3,964,717 A | 6/1976 | Hansen |
| 4,133,371 A | 1/1979 | Birch et al. |
| 4,357,287 A | 11/1982 | Schonert |
| 4,369,926 A | 1/1983 | Rasmussen et al. |
| 4,485,974 A | 12/1984 | Lass |
| 4,582,260 A | 4/1986 | Folsberg |
| 4,703,897 A | 11/1987 | Beisner et al. |

(Continued)

FOREIGN PATENT DOCUMENTS
WO 8102583 A1 9/1981

OTHER PUBLICATIONS

The International Search Report dated May 18, 2011, 2 pages.

*Primary Examiner* — John C Hong
(74) *Attorney, Agent, or Firm* — Aaron M. Pile; Daniel DeJoseph; Jeffrey A. Sharp

(57) ABSTRACT

A method of making a wearable surface for a device configured for material comminution includes positioning inserts adjacent to a first metal structure positioning a second metal structure adjacent to the inserts and the first metal structure such that there is a gap between the second metal structure and the first metal structure, and positioning at least one explosive adjacent to the second metal structure. The one or more explosives are ignited adjacent to the second metal structure to cause a portion of the first metal structure to deform to attach the inserts to the first metal structure. The wearable surface may be, for example, a semi-autogenous layer of a roller or may be a wearable surface of a crushing body of a crushing device configured to impact, crush, or grind material such as rock, minerals, ore or agglomerated material. Devices that include such a wearable surface are also disclosed.

16 Claims, 13 Drawing Sheets

U.S. PATENT DOCUMENTS

| | | |
|---|---|---|
| 4,844,321 A | 7/1989 | Matsuzawa et al. |
| 4,848,683 A | 7/1989 | Kawatsu |
| 5,203,513 A | 4/1993 | Keller et al. |
| 5,242,098 A | 9/1993 | Hardwick |
| 5,269,477 A | 12/1993 | Buchholtz et al. |
| 5,318,213 A | 6/1994 | Strickland et al. |
| 5,400,945 A | 3/1995 | Bergmann et al. |
| 5,470,012 A | 11/1995 | Linse et al. |
| 5,531,396 A | 7/1996 | Kinnunen et al. |
| 5,755,033 A | 5/1998 | Gunter et al. |
| 5,823,450 A | 10/1998 | Folsberg |
| 5,967,431 A | 10/1999 | Stafford et al. |
| 6,207,294 B1 * | 3/2001 | Rutter .................. 428/609 |
| 6,523,767 B1 | 2/2003 | Ramesohl |
| 7,300,708 B2 | 11/2007 | Gigliotti, Jr. et al. |
| 7,517,580 B2 | 4/2009 | Mulligan et al. |
| 2007/0215733 A1 | 9/2007 | Splinter et al. |
| 2008/0286598 A1 | 11/2008 | McCracken et al. |

\* cited by examiner

WEARABLE SURFACE FOR A DEVICE CONFIGURED FOR MATERIAL COMMINUTION

FIELD OF THE INVENTION

The present invention relates to wearable surfaces for the comminution of material. Such wearable surfaces may be provided on rollers of roller mills for grinding material or crushing surfaces of crushing devices, such as crushers, grinders, presses, roller presses, mills or other devices configured to crush material or grind material. Preferably, the wearable surface is configured to form a semi-autogenous layer for a crushing body such as a die or roller of a mill.

BACKGROUND OF THE INVENTION

Mills, presses, crushers, and other crushing devices used to grind material often include a crushing body or multiple crushing bodies that are configured to impact material to crush or the material. Often the crushing bodies are configured to grind the material between a surface of the crushing body and a table, wall, or other surface. Examples of such crushing devices may be appreciated from U.S. Pat. Nos. 252,755, 1,225,061, 1,589,302, 3,955,766, 3,964,717, 4,369,926, 4,485,974, 4,582,260, 5,203,513, 5,823,450, and 6,523,767. As another example, roller presses may have one or more rollers configured to impact material to grind the material. Each roller may include a wear surface. The wear surface may be attached to the roller. For instance, the wear surface of the roller may be welded to the roller.

A wear surface typically experiences wear as material is crushed by the wear surface. After a period of time, the wear surface may experience wear sufficiently that it is unable to crush material or experiences a great reduction in crushing ability. For example, portions of the wear surface may erode or become broken during use and subsequently requires replacement or repair.

Some wearable surfaces used in crushing devices include hexagonal tiles, such as the tiles disclosed in U.S. Pat. No. 5,755,033. A tiled surface can include tiles that have gaps between the tiles. The tiles are affixed to a base material and are harder than the base material. Such tiles are often costly to process due to the size of the equipment necessary to make such products. Further, such tiled wearable surfaces are usually not capable of being repaired while the wearable surface is positioned in a plant or processing line for grinding material. The inability to conduct in-situ repairs on such products can be a major hindrance for a manufacturer and can greatly increase the cost of maintaining or repairing such devices.

Other wearable surfaces used in crushing devices may be appreciated from U.S. Pat. No. 5,269,477. Such wearable surfaces include insert members embedded in a surface of a cylindrical press roll. A binding ring may be used to attach the inserts to the press roll. The insert members may project radially into the surface of the roll. The insert members are configured to crush material. Rollers with such a wear surface may require a relatively intensive amount of labor to embed the insert members into the surface of a roller. The lead times for manufacturing such products is also relatively high. Further, serial production is difficult for such rollers. These types of rollers may also have a relatively limited capacity for in-situ repair, such as repair while the rollers are on equipment in a production line of a manufacturing facility.

A new wearable surface is needed that may permit in-situ repairs and reduce the cost of producing wearable surfaces for crushing bodies of a crushing device. Preferably, such a wearable surface is able to permit in-situ repairs that can take place while equipment is in a product line of a manufacturing facility and can permit relatively short lead times for manufacturing.

SUMMARY OF THE INVENTION

A method of making a wearable surface that may be utilized in crushing devices includes the steps of positioning inserts adjacent to a first metal structure, positioning a second metal structure adjacent to the inserts such that there is a gap between the first metal structure and the second metal structure, placing at least one explosive adjacent to the second metal structure and igniting the at least one explosive adjacent to the second metal structure to deform the first metal structure such that a portion of the first metal structure engages the inserts to attach the inserts to the first metal structure to form a wearable surface.

The one or more explosives may be positioned on a side of the second metal structure that is opposite the side of the second metal structure facing toward the gap. For instance, the second metal structure may include a first side and a second side opposite the first side. The first side may face the gap and may also help define the gap between the second metals structure and the first metal structure. The one or more explosives may be positioned on the second side or may be positioned near the second side of the metal structure.

After the wearable surface is formed, the second metal structure may be moved away from the wearable surface or the wearable surface may be moved away from the second metal structure. For instance, the second metal structure may be moved away from the wearable surface by knocking or hitting the second metal structure to move the second metal structure away from the wearable surface formed from explosion welding of the first metal structure and the inserts. Of course, the second metal structure may be moved by machines or by pulling on the second metal structure as well. As an alternative, the second metal structure may remain positioned adjacent to the second metal structure or be attached to the first metal structure. Such an attachment may include a metallurgical bond, or an intramolecular bond, between the first metal structure and the second metal structure in some embodiments of the method.

The inserts may be composed of carbide, tungsten carbide or other material that is harder than the material of the first metal structure. The first and second metal structures may both be composed of grade 4140 steel. Of course, the first and second metal structures may be composed of other metals such as different grades of steel or alloys. Each metal structure may also be composed of different metals.

Preferably, the formed wearable surface is configured to have the inserts distributed within the wearable surface so that the wearable surface may form a semi-autogenous layer. In some embodiments, the semi-autogenous layer may only be formed after a grinding operation has commenced. For example, a wearable surface may be formed and may experience wear at certain locations after being utilized in crushing operations for a period of time. The wear that is experienced may form the semi-autogenous layer for such embodiments.

In some embodiments of the method, the first metal structure may be a plate, a pipe, a tube or a cylindrical structure and the second metal structure may be a plate, a pipe, a tube or a cylindrical structure. Preferably, the first metal structure is generally the same shape as the second metal structure and the second metal structure has a perimeter that is larger than or equal to the perimeter of the first metal structure.

Some embodiments of the method include additional steps. For instance, the wearable surface may be cut to a desired shape, bent into a desired shape, flattened into a desired shape, tested, or any combination of cutting, bending, flattening and testing. The bending, flattening, cutting and testing are preferably configured to permit the wearable surface to be attached to a grinding component of a crushing device. The testing of the wearable surface may be designed to ensure that the inserts attached to the first metal structure, the first metal structure and the formed wearable surface meet design objectives or quality objectives. Such testing may include visual inspection, non destructive testing, ultrasonic testing, physical measurements, and having mechanical tests run on the wearable surface.

Additional steps that may be used in additional embodiments of the method may also include grinding the first metal structure and the second metal structure to remove surface defects such as scale or other defects prior to the positioning of the metal structures and inserts or prior to the igniting of the explosives.

The igniting of the one or more explosives may occur at different locations for different embodiments of the method to meet a particular design objective or fabrication objective. For instance, the ignition point for igniting the one or more explosives may be at a front center position, a top center position, a top middle central position or other position.

It should be understood that the first metal structure may be positioned on an anvil or other support to support the first metal structure and the inserts during the explosion welding of the inserts and the first metal structure. For example, one or more anvils or one or more risers may be positioned below the first metal structure to support the first metal structure during the explosion welding of the first metal structure and the inserts.

In some embodiments of the method, the one or more explosives may also be positioned adjacent to and above the second metal structure. A cover plate and other cover structures may be positioned above the first metal structure so that the cover plate is between the explosives and the first metal structure. A riser plate may also be positioned between the cover plate and the first metal structure.

Preferably, the crushing device is a mill, a crusher, a grinding mechanism, or other material comminution device and the wearable surface is configured for attaching to the grinding component of such a device so that the wearable surface is able to impact material or compress material to crush the material. Preferably, the material comminution device is sized and configured for use in the minerals industry or the cement manufacturing industry. Of course, the crushing device may be configured for use in other industries as well.

Embodiments of the method may also be utilized for retrofitting wearable surfaces of grinding components while a crushing device is in-situ or in a position within a production line or in a manufacturing facility. For instance, the wearable surface may be configured to be attached to a grinding component of a material comminution device so the wearable surface is able to replace the wearable surface or a portion of the wearable surface of the grinding component while the device is positioned in a crushing circuit. For instance, a wearable surface of a grinding component may be retrofitted or repaired while a crushing device is in its production line, in a plant or part of a crushing circuit operated by a customer who purchased the crushing device from a supplier.

Embodiments of the method of making a wearable surface may also include providing a third metal structure, providing second inserts, positioning the second inserts adjacent to the third metal structure, and positioning the third metal structure and the second inserts adjacent to the first metal structure such that the ignition of the one or more explosives also results in deformation of a portion of the third metal structure such that the second inserts are attached to the third metal structure or are mechanically interlocked with a deformed portion of that metal structure. The ignition of the one or more explosive can also explosion weld the third metal structure to the first metal structure to form the wearable surface. It should be appreciated that such explosion welding may form a metallurgical bond, or an intramolecular bond, between the first metal structure and the third metal structure. The second inserts are preferably harder than the material of the third metal structure.

It should be appreciated that additional metal structures and inserts embedded within those metal structures may also be included in other embodiments of the method so that ignition of the one or more explosions forms a wearable surface from the many different insert embedded metal structures.

In some embodiments of the method, the inserts may be embedded in the first metal structure and bonded to the first metal structure during the positioning of the inserts. For example, the inserts may be cemented or adhered within recesses formed in the first metal structure to position the inserts at a predetermined depth within the first metal structure. After the ignition of the explosive material, a portion of the first metal structure may cover the inserts or a portion of each of the inserts. For instance, an outer portion of the first metal structure may be deformed such that the first metal structure partially covers or completely covers the inserts after the one or more explosives are ignited to fixedly and securely attach the inserts to the first metal structure via deformation of the first metal structure to form the wearable surface. The depth of the inserts may be, for example, 0.125 inches, 0.25 inches, 0.375 inches, 0.5 inches, 0.625 inches, 0.75 inches, or 0.875 inches, or a combination of different depths.

If the metal structures are cylindrical or generally cylindrical, each structure may have a diameter. The first metal structure's diameter may be smaller than the second metal structure's diameter. Preferably, the first metal structure has more mass then the second metal structure. The inserts may be insert members composed of various different materials. For instance, inserts may be composed of ceramics, steels, alloys, or other materials. Preferably, the inserts are composed of tungsten carbide, tungsten-carbide cobalt, cemented carbide, ceramic material or composite material. Inserts may be obtained from suppliers such as Kennametal, Hardmetal Solutions, or other suppliers. Of course, inserts may alternatively be made and used by the company fabricating the wearable surfaces.

The inserts may have different shapes or sizes. For instance, inserts may be conical in shape, tapered in shape, cylindrical in shape, rectangular in shape, spherical in shape, elliptical in shape, circular in shape, or polygonal in shape. The inserts may be of various sizes as well. The inserts may also be provided such that different inserts have different shapes and sizes.

In some embodiments of the method, the inserts may include a first set of inserts that are smaller than a second set of inserts. The first set of inserts may be positioned partially within the first metal structure at different depths than the second set of inserts.

It should be appreciated that the inserts may be cemented, bonded or adhered in recesses formed in the first metal structure prior to the ignition of the one or more explosives that may be used to deform a portion of a metal structure to attach the inserts to that metal structure. The cementing, bonding, or adhering of the inserts may help keep the inserts positioned or embedded within a metal structure when the one or more explosives are ignited or explode.

Embodiments of crushing devices are also disclosed herein. A crushing device may be configured to crush material such as ore, minerals, rock, stone, agglomerated material, material used for cement manufacturing, material used for concrete manufacturing such as ready mix concrete manufacturing or other material. A crushing device may include a moveable crushing body, a first surface adjacent to the moveable crushing body that is sized and configured to support or retain material to be impacted by the crushing body and a wearable surface attached to the crushing body. The wearable surface is positioned on the crushing body such that the wearable surface impacts the material to crush the material. At least one of the wearable surface and the first surface includes a first metal structure and inserts attached to the first metal structure via deformation of the first metal structure caused by the ignition of one or more explosive materials utilizing an applicable embodiment of an above discussed method, which are also discussed in more detail below. Preferably, the inserts are harder than the first metal structure.

Examples of embodiments of the crushing device may include a crushing device that has a wearable surface or first surface that is formed via a method described herein.

For example, some embodiments of the crushing device may only include a wearable surface attached to a crushing body that is formed by a first metal structure deformed via the ignition of one or more explosives adjacent to a second metal structure to plastically deform a portion of the first metal structure to attach the inserts to the first metal structure. Other embodiments of the crushing device may only include a first surface for retaining or supporting material that is formed by a first metal structure deformed via the ignition of one or more explosives adjacent to a second metal structure to plastically deform a portion of the first metal structure to attach the inserts to the first metal structure. Yet others may include both a wearable surface attached to a crushing body that is formed by a first metal structure deformed via the ignition of one or more explosives adjacent to a second metal structure to plastically deform a portion of the first metal structure to attach the inserts to the first metal structure and also include a first surface for retaining or supporting material that is formed by a metal structure deformed via the ignition of one or more explosives adjacent to another metal structure to plastically deform a portion of the metal structure to attach the inserts to the metal structure.

In some embodiments, the first metal structure may be a roller comprised of steel and the wearable surface may be a semi-autogenous layer of the roller or may be configured to wear during use so that the wearable surface defines a semi-autogenous layer after experiences some amount of wear or some predetermine amount of wear. The first surface may be the surface of an anvil, a table, or a conveyor or may be the surface of a support or other body.

Embodiments of the crushing device may include a roller mill, a vertical mill, a cone crusher, other crushers, other mills, sizers, comminution devices and grinding devices. It is also contemplated the embodiments of the crushing device may include a pulverizer. The crushing body of the crushing device may be a die or roller or other body configured to impact material for crushing, milling, grinding, sizing or pulverizing material.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred embodiments of the wearable surface, devices configured for the comminution of material that utilizes an embodiment of the wearable surface and methods of making the same are shown in the accompanying drawings.

DETAILED DESCRIPTION OF PRESENT PREFERRED EMBODIMENTS

Figure 1:
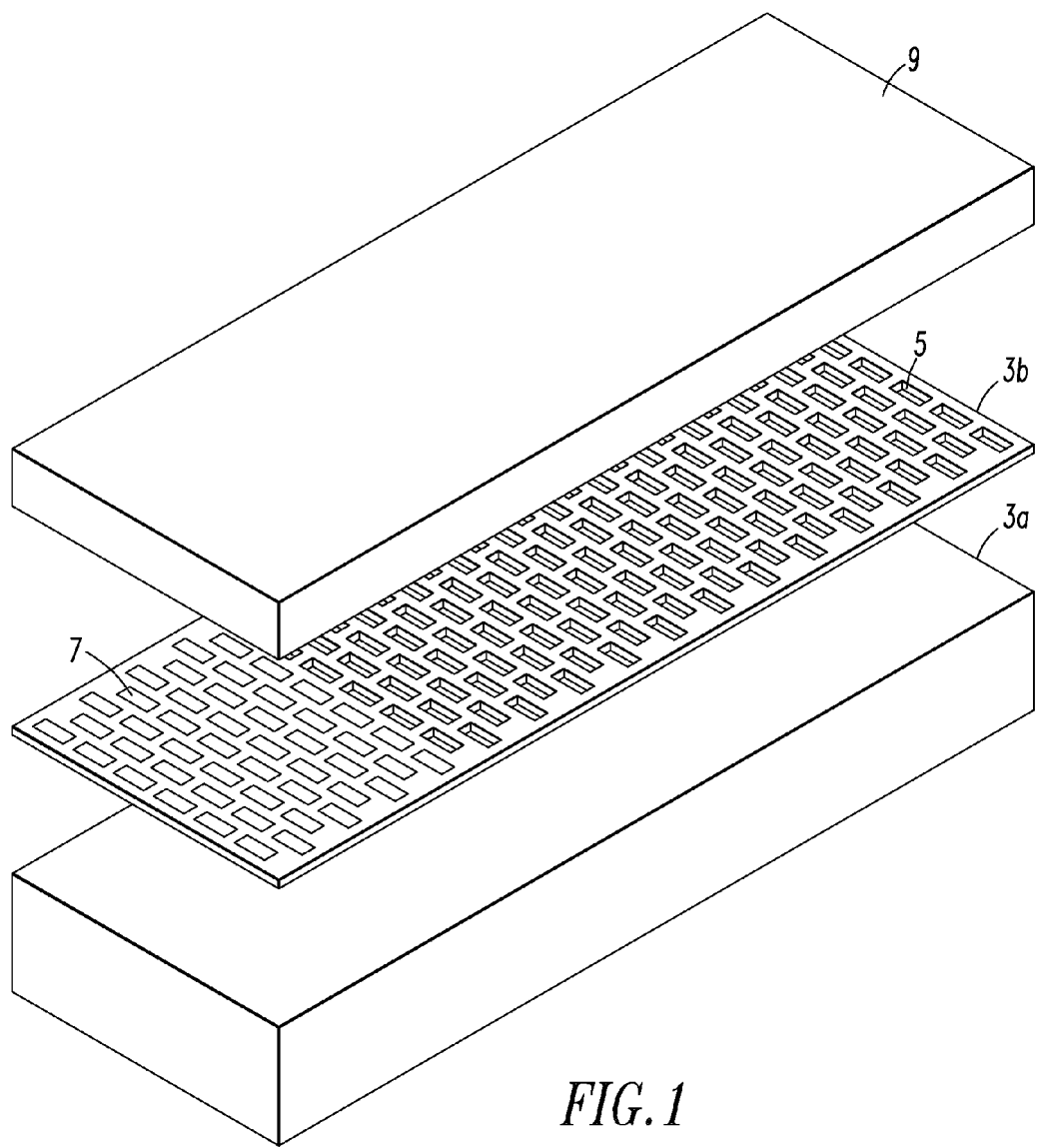
FIG. 1 is an exploded view illustrating a first present preferred embodiment a wearable surface for a crushing device adjacent to a second metal structure.

Referring to FIG. 1, a wearable surface may be formed on a crushing body of a crushing device such as a roller mill, vertical roller mill, crusher, or grinding device. For example, a crushing body may include a base portion 3a and an outer portion 3b. The outer portion 3b may include recesses 5 that are sized and configured to receive insert members 7. Preferably, the outer portion 3b is integral with the base portion 3a or are portions of the same metal body or structure, such as a metal cylindrical structure.

The insert members 7 may be sized and configured such that each insert is wider than it is long or may be configured to be a square-like shape or may be configured to have different shapes and sizes. The insert members are preferably composed of tungsten carbide that have a cylindrical shape, conical shape or tapered shape. The inserts may include inserts of different shapes or sizes or all the inserts may be the same shape and size. The insert members may be composed of other hard materials, such as, for example, industrial made diamonds, diamonds, or other hard materials that are harder than the material of outer portion 3b.

The inserts are preferably harder than the outer portion 3b and base portion 3a. For example, the inserts preferably have a harder Brinell value, Rockwell value, Vickers value, Knoop value or Leeb Rebound value than the hardness rating of the crushing body, or the outer portion 3b of the crushing body. As another example, the inserts preferably have a harder durometer value than the crushing body or outer portion 3b of the crushing body.

Each insert 7 may be positioned in a recess 5 formed in the outer portion 3b. Mortar such as high temperature mortar, cement, a binder, or an adhesive may be used to position the inserts 7 within the recesses 5 and bond the inserts to the crushing body. It should be appreciated that any adhesive that is commercially available, relatively low in cost, and relatively reliable may preferably be used. The inserts may be positioned so that the entire insert is within a recess or may be positioned so that only a portion of the insert is within the recess. Preferably, the inserts are positioned in the recesses such that the outermost portions of the inserts are recessed relative to the outermost portion of the outer portion 3b.

A second metal structure 9 may be positioned over the inserts 7 and crushing body or adjacent to the inserts 7 and crushing body. For example, the second metal structure 9 may be positioned such that there is a gap between the crushing body and the second metal structure 9. The second metal structure 9 may be a flyer plate, a flyer tube, a driver plate, a driver tube, a driver pipe, or other metal structure. The inserts 7 are preferably harder than the second metal structure 9.

The outer portion 3b and the second metal structure 9 may be grinded prior to the positioning of these structures or prior to ignition of any explosives. The grinding may be used to remove scale or other surface defects from the surfaces of the metal structures.

Preferably, the second metal structure 9 is positioned adjacent to the inserts 7 and the crushing body such that there is a gap formed between the second metal structure and the embedded inserts and outer portion 3b of the crushing body. The gap may be maintained by positioning spacers between the outer portion 3b and the second metal structure. The spacers may define the size of the gap. The width of the gap may define a standoff size.

One or more explosives may be positioned adjacent to the second metal structure. For instance, the second metal structure 9 may have a first side that faces toward the gap and the outer portion 3b of the crushing body and a second side opposite the first side. The one or more explosives may be positioned adjacent to the second side of the second metal structure 9. For instance, the one or more explosives may be positioned on the second side of the second metal structure 9 or near the second side of the second metal structure 9. The one or more explosives such as for example, explosive material, may be obtained from suppliers or vendors of such materials.

It is contemplated that the one or more explosives may include explosive material that includes any number of suitable explosive materials or combination of explosive materials. For example, it is contemplated that explosive material that may be used could include ammonium nitrate, amatol, guanidine, dynamite, cyclonite, plastic explosives, explosive powder, ammonium nitrate/fuel oil (ANFO), EL819 type explosive material, T200 type explosive material or other explosive materials.

In some embodiments of the method, a cover plate or other structure may be positioned over a top of the second metal structure 9 and the crushing body. A portion of the one or more explosives or a different explosive may be positioned on the cover plate and be in contact with the one or more explosives positioned near the second metal structure as well.

Alternatively, the second metal structure and the crushing body may be arranged such that the second metal structure covers the top of the first metal structure so that no cover plate is needed or is otherwise used.

The explosives may be ignited to force the second metal structure 9 into contact with the outer portion 3b of the crushing body to deform the outer portion 3b of the crushing body to attach the inserts to the crushing body to form a wearable surface. The second metal structure 9 may be moved away from the crushing body that has the formed wearable surface after the deformation of the outer portion 3b is completed. For example, the second metal structure may be cut and then hit or impacted by a tool or machine to separate or remove the second metal structure 9 from the inserts and the crushing body. Alternatively the crushing body may be moved away from the second metal structure 9 or both structures may be moved away from each other. Preferably, the inserts are covered or encapsulated by a portion of the crushing body after the explosion welding due to a deformation of the crushing body caused by the force from the ignited one or more explosives that is transferred via the second metal structure 9.

Figure 1A:
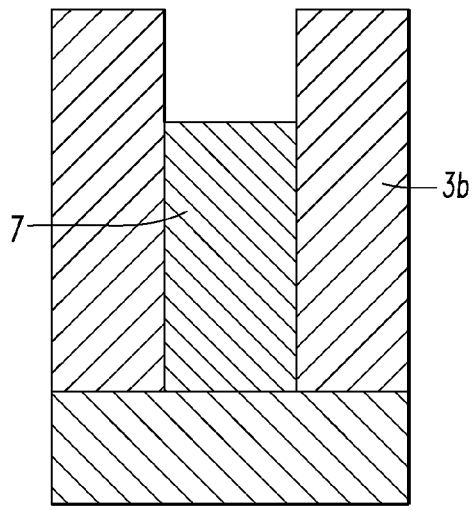
FIG. 1A is a fragmentary cross sectional view illustrating an insert positioned within a recess of the outer portion of a crushing body prior to the ignition of any explosive material.
Figure 1B:
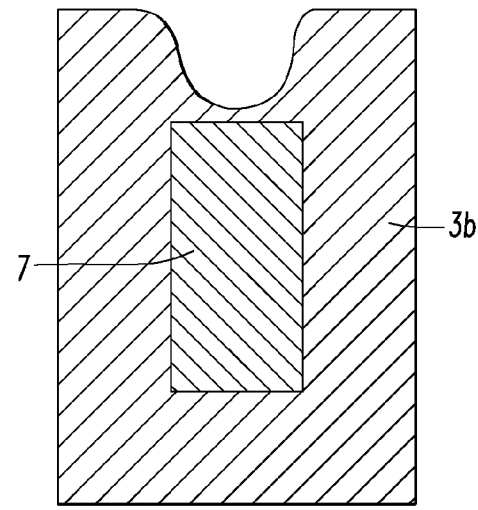
FIG. 1B is a fragmentary cross sectional view illustrating an insert positioned within a recess of the outer portion of a crushing body after explosive material was ignited and the second metal structure transferred force from the ignited explosives to the outer portion of the crushing body to deform a portion of the outer portion of the crushing body to fully encapsulate the insert for attaching the insert to the crushing body.
Figure 1C:
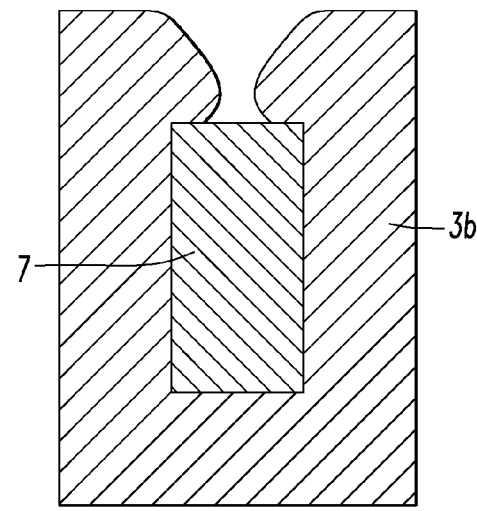
FIG. 1C is a fragmentary cross sectional view illustrating an insert positioned within a recess of the outer portion of a crushing body after explosive material was ignited and the second metal structure transferred force from the ignited explosives to the outer portion of the crushing body to deform a portion of the outer portion of the crushing body to partially encapsulate the insert for attaching the insert to the crushing body.

The deformation of the outer portion 3b may also cause the outer portion 3b to engage the inserts 7 or cause a mechanical interlock between the outer portion 3b and the inserts 7 to attach the inserts to the outer portion 3b. Example of such deformation that occurs to attach the inserts 7 to the outer portion 3b of the crushing body may be appreciated from FIGS. 1A, 1B and 1C. The deformation caused by the ignition of the explosive material that provides an attachment of the inserts to the outer portion 3b of the crushing body may be considered an explosive forging ("EXF") of the inserts to the outer portion 3b of the crushing body.

It should be appreciated that the ignited explosives do not cause explosion welding or other welding to occur between the inserts 7 and the outer portion 3b of the crushing body. No metallurgical bonding between the inserts 7 and the outer portion 3b may take place.

If the crushing body is a cylinder or other structure that includes a central channel therein, that channel may be filled by a central plug prior to the ignition of explosives. The placement of the plug may support the structure and prevent the structure from becoming damaged or deforming in an undesirable way as a result of any force that may be transferred from ignited explosives. After the explosive material is ignited and the inserts are attached to the metal structure as desired, the central plug may be removed as well.

The wearable surface that is formed may be configured so that the wearable surface experiences wear during crushing operations to form a semi-autogenous layer or semi-autogenous surface of the crushing body. For instance, the outer portion of the wearable surface that covers the inserts may experience wear and be eroded off of the inserts over time to form a semi-autogenous layer. As one example, portions of the wearable surface covering the inserts may experience wear and erode off of the wearable surface, exposing a portion of the inserts, which are harder than the material covering them. The exposed portions of the inserts may be positioned proud relative to adjacent portions of the metal structure to which they are attached. The exposed portions of the recessed inserts that are subsequently exposed after comminution operations or crushing operations have begun may then form or help define a semi-autogenous layer of the wearable surface.

The crushing body is preferably a roller of a roller mill, vertical mill or roller press, but may be sized and configured to be a component of other crushing devices such as grinding devices, milling devices, crushers, pulverizers, sizers, or comminution devices as well. For example, the crushing body may be a metal plate or a metal cylindrical structure and the second metal structure 9 may be a metal plate or a metal cylindrical structure. Each metal cylindrical structure may be, for example, a metal tube, a metal disc, a metal cylinder, or a metal pipe. The metal of the base portion 3a, outer portion 3b and the metal of the second metal structure 9 may be grade 4140 steel. It should be understood that other steels, alloys or other metals may also be used for the crushing body and the second metal structure to meet a particular design objective. It is also contemplated that the outer portion 3b, base portion 3a and second metal structure 9 may also be composed of different metals in some alternative embodiments.

In other embodiments, a crushing body may have a wearable surface that is formed from multiple layers of insert embedded material. For example, a wearable surface may include a first base portion 23 that is attached to a first insert embedded metal structure 25 that includes inserts 27, a second insert embedded metal structure 31, an intermediate metal structure 29 between the first insert embedded metal structure 25 and second insert embedded metal structure 31 and a second base metal structure 33.

It is contemplated that the metal structures 23, 25, 29, 31 and 33 may be arranged adjacent to each other in series and then be formed by explosion welding the metal structures together. For instance, the first base portion 23 may be a flyer plate or flyer tube positioned adjacent to a metal structure 25 so that a gap exists between that metal structure and the flyer plate or flyer tube. The metal structures 29, 31 and 33 may be positioned in series so that gaps separate the successively arranged metal structures from adjacent metal structures. Each gap may have a different width or may have the same width. Each gap's width defines standoff distance separating metal structures positioned on opposite sides of a respective gap. Of course, some gap widths may be the same and others may be different. Explosives may then be ignited adjacent to the base structure 21 to explosion weld the metal structures together.

The widths of the gaps may be determined to meet a particular design objective. It should be understood that the greater the gap width, the more force that will be transferred to a particular metal structure from the ignited explosives.

Alternatively, the different layers may be explosion welded together in different shots. The inserts are preferably embedded within the insert embedded metal structures prior to the explosion welding of the metal structures. After the ignition of the one or more explosives, the inserts embedded within each metal structure may be attached to their respective metal structures by a deformed portion of the metal structures such that the deformed portions engage those inserts or mechanically interlock with at least a portion of the surface area of those inserts.

Preferably, the inserts are arranged so that the inserts of the first embedded metal structure 25 are staggered relative to the inserts arranged in the second insert embedded metal structure 31. One present preferred staggered arrangement may be appreciated from FIG. 7A, which is discussed in more detail below.

Figure 2B:
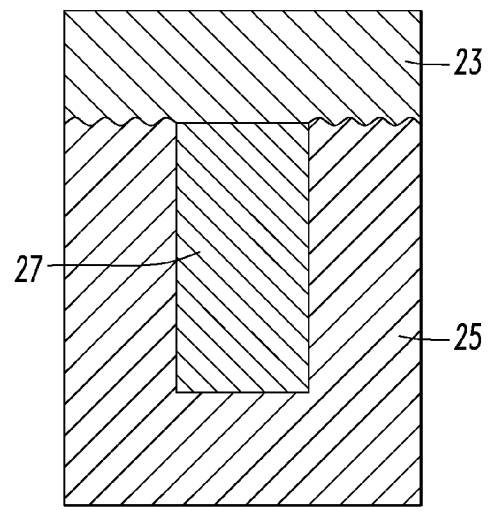
FIG. 2B is a fragmentary cross sectional view illustrating an insert positioned within a recess of a first metal structure after explosive material was ignited and a second metal structure was explosively welded to the first metal structure.
Figure 2:
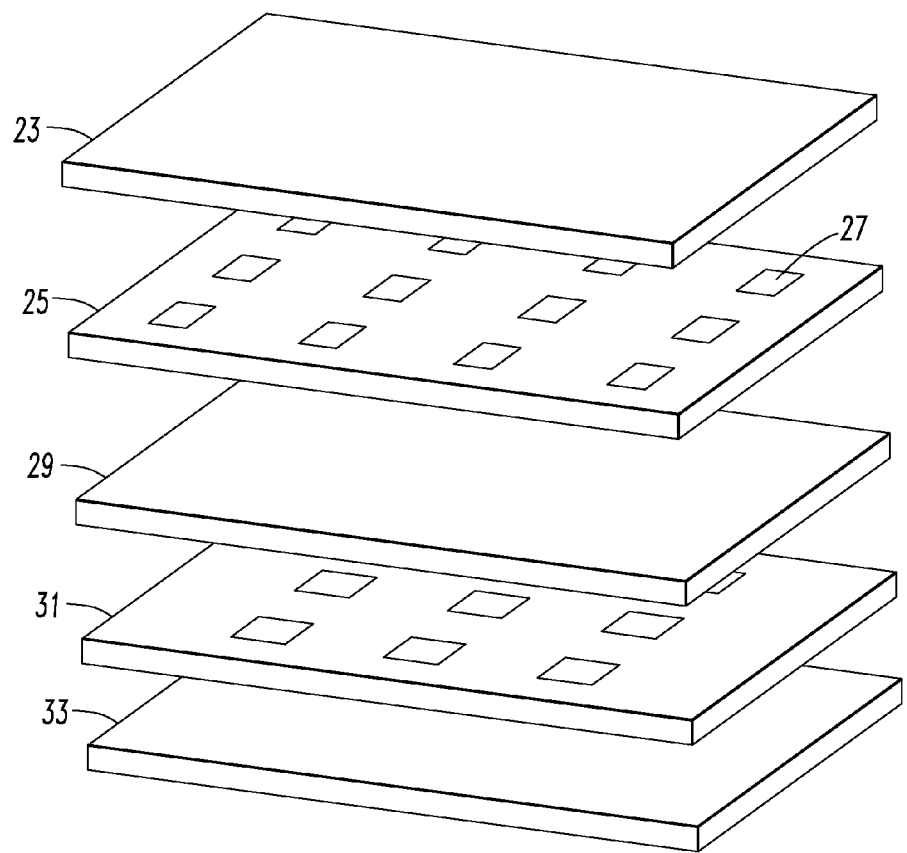
FIG. 2 is an exploded view illustrating a second present preferred embodiment of a wearable surface for a crushing device.

It should be appreciated that the ignited explosives do not cause explosion welding or other welding to occur between the inserts and the metal structures in which they are embedded. No intramolecular bonding or metallurgical bonding between the inserts and the metal structures may take place. However, explosive welding and the formation of metallurgical bonding may take place between the metal structures. For example, the first base portion 23 may be explosively welded to the first intermediate insert embedded metal structure 25 such that intramolecular bonding, or metallurgical bonding, between the metal of that metal structure and the base portion 23 occurs as may be appreciated from FIG. 2B. The first insert embedded metal structure 25 may also be explosively welded to the intermediate metal structure 29 as well and the intermediate metal structure may be explosively welded to the second intermediate insert embedded metal structure 31. The second intermediate insert embedded metal structure 31 may also be explosively welded to the second base structure 33.

Figure 2A:
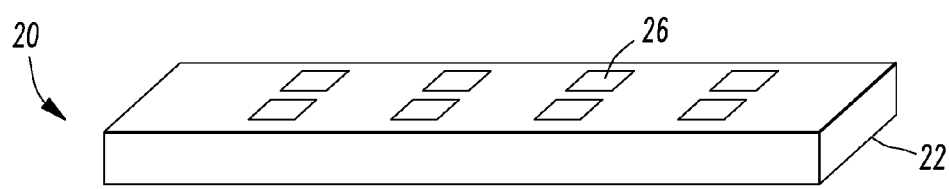
FIG. 2A is an exploded view illustrating a third present preferred embodiment of a wearable surface for a crushing device.
Figure 2A:
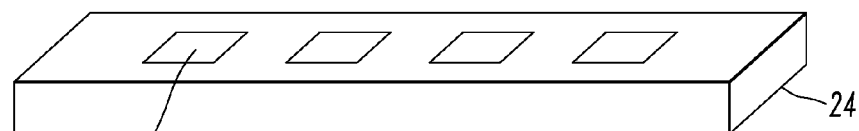
Figure 3:
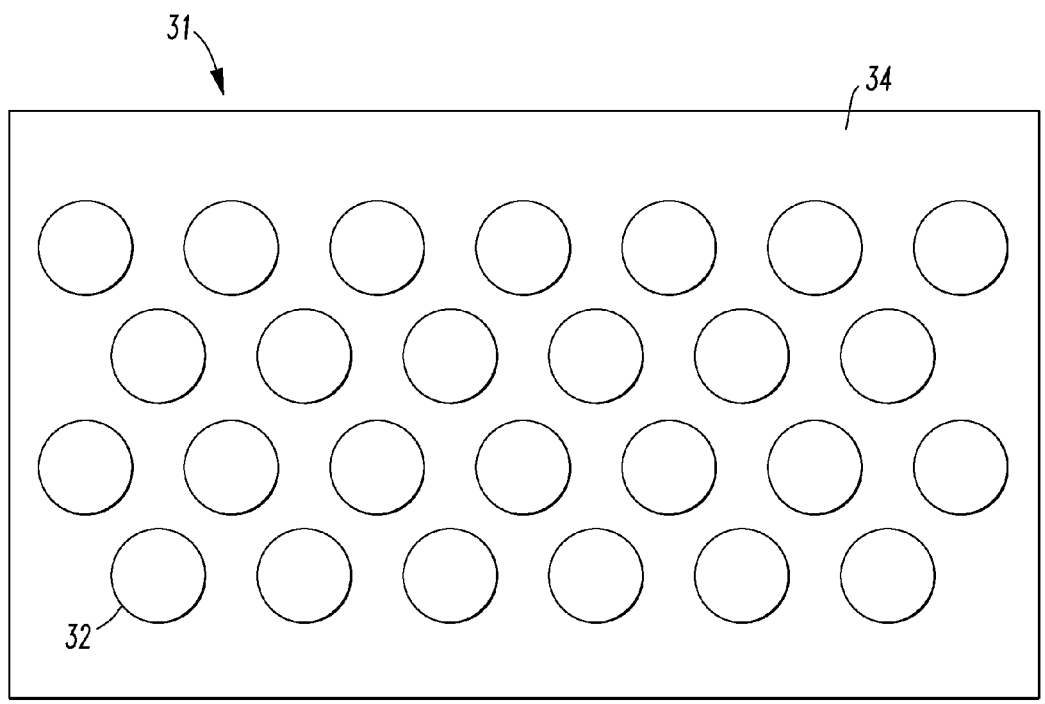
FIG. 3 is a side view of a first portion of a present preferred first metal structure having a first set of inserts positioned adjacent to the first metal structure in a first arrangement.
Figure 4:
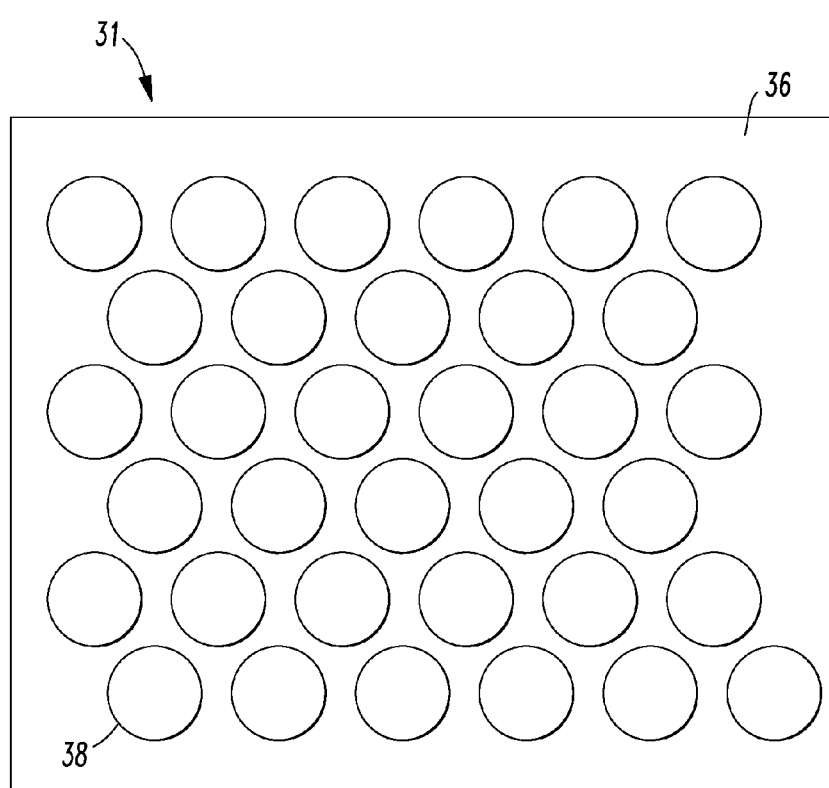
FIG. 4 is a side view of a second portion of a present preferred first metal structure having a second set of inserts positioned adjacent to the first metal structure in a second arrangement.
Figure 5:
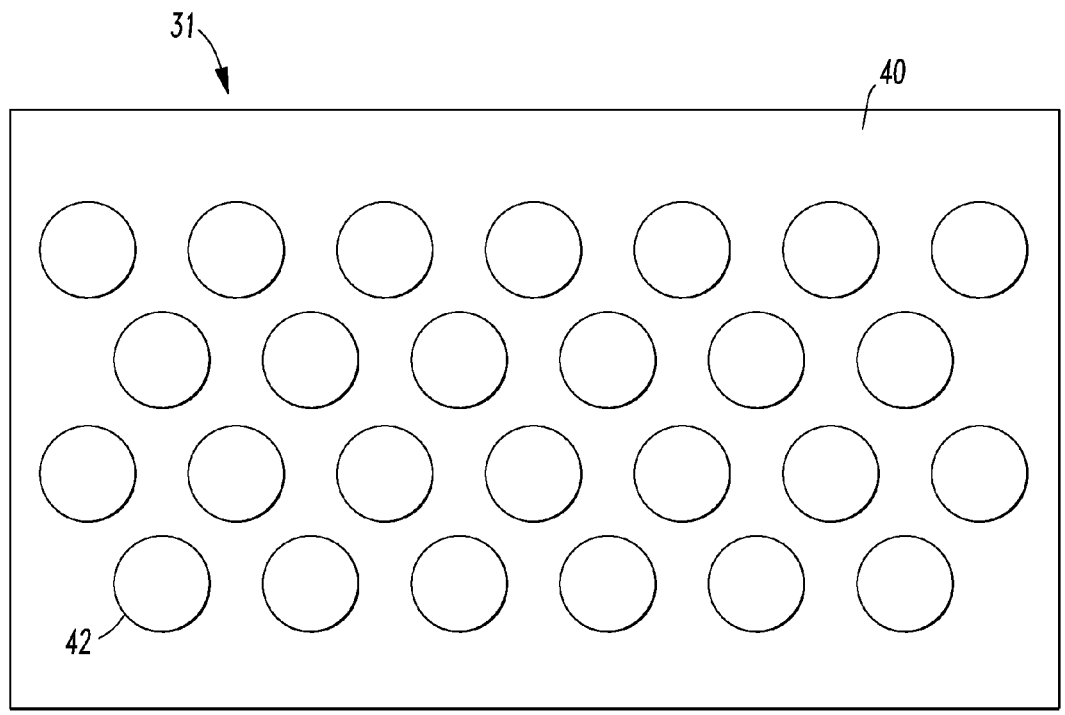
FIG. 5 is a side view of a third portion of a present preferred first metal structure having a third set of inserts positioned adjacent to the first metal structure in a third arrangement.
Figure 6:
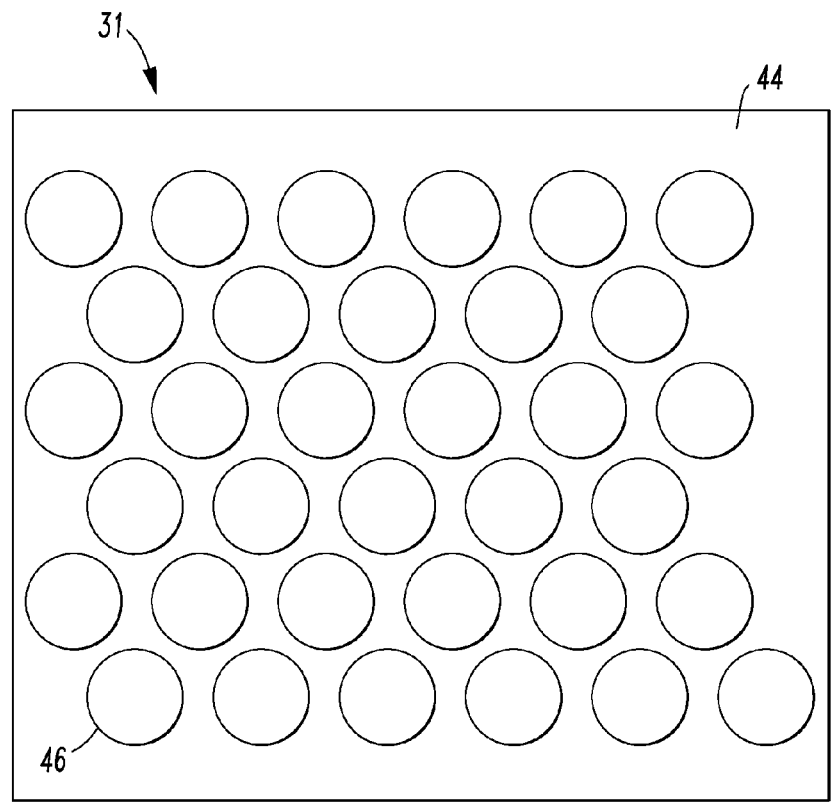
FIG. 6 is a side view of a fourth portion of a present preferred first metal structure having a fourth set of inserts positioned adjacent to the first metal structure in a fourth arrangement.

As another alternative, a wearable surface 20 may be formed by positioning multiple insert embedded metal structures adjacent to each other and explosion welding all those structures together as may be appreciated from FIG. 2A. For instance, a first insert embedded metal structure 22 may be positioned adjacent to a second insert embedded metal structure 24 such that the metal structures are spaced apart from each other by a desired standoff distance. The first insert embedded metal structure 22 may include inserts 26 in a first arrangement that is different than the arrangement of inserts 28 embedded in the second metal structure 24. For example, the different arrangements may be designed so that a formed wearable surface includes inserts that are positioned in rows that inserts in one row offset inserts positioned in adjacent rows of inserts. A flyer plate or flyer tube may be positioned near one of the insert embedded structures so the flyer plate or flyer tube is spaced a desired standoff distance from that insert embedded metal structure. Explosive material may be positioned adjacent to the flyer tube or flyer plate such that the flyer tube or flyer plate impacts one of the metal structures to explosion weld the first metal structure 22 to the second metal structure 24, causing a transfer of force sufficient to deform a portion of the first metal structure 22 to attach the inserts embedded within that structure and also deform a portion of the second metal structure 24 to attach the inserts embedded within that structure. The flyer plate or flyer tube may also be explosion welded to one of the metal structures.

The resulting structure may then undergo cutting, bending, flattening or other machining to form a desired shape for use as a wearable surface or a portion of such a wearable surface. The wearable surface may also undergo stress relief treatment, such as a heat treatment, testing, or other steps necessary for acceptably manufacturing the formed structure.

As another example, three metal structures that each have inserts embedded into the metal structures may be positioned in series adjacent to each other. Each structure may be positioned so that a standoff distance exists between each metal structure. Each standoff distance may be the same distance or may be different distances depending on design and manufacturing objectives. A flyer plate may then be positioned adjacent to one of those metal structures such that a gap is formed between one of the metal structures and the flyer plate that defines yet another standoff distance. The explosives may be positioned on the flyer plate or flyer tube. The explosives may then be ignited to explosion weld the insert embedded metal structures together. The explosion welding may also act to deform each of the metal structures sufficiently to attach the inserts to the metal structures in which they are embedded. The flyer plate may then be moved away from the explosion welded structure or may be explosion welded to one of the metal structures to form a portion of the wearable surface. The explosion welded structure may then be cut or bent and undergoing additional machining and finishing processes for fabricating at least a wearable surface portion of a crushing body of a crushing device.

The inserts of the insert embedded metal structures are preferably composed of material that is harder than the metal of the other components. Preferably, the inserts are composed of tungsten carbide. The inserts may be composed of other metals, alloys, or ceramic materials that are suitable for meeting a particular crushing objective or design requirement.

The inserts of the insert embedded structures may be polygonal, conical, circular, cylindrical, rectangular, elliptical, or of other shapes or structures to meet a desired design objective. For example, the inserts may be thirty millimeter inserts, forty millimeter inserts, be of other sizes or include a combination of sized and shaped insert members to meet a desired design objective.

A wearable surface may also be formed by a method utilizing multiple explosion welding steps. For instance, the first insert embedded metal structure 22 may be positioned adjacent to a metal structure such as a flyer plate or a flyer tube. Explosives may then be ignited adjacent to this metal structure to deform a portion of the first insert embedded metal structure 22 sufficiently to attach the inserts to that structure. The flyer plate may then be moved away from the attached components or be explosion welded to the first insert embedded metal structure 22. Thereafter, the second insert embedded metal structure 24 may be positioned adjacent to the first insert embedded metal structure 22. A flyer plate or other metal structure may then be positioned adjacent to the first insert embedded metal structure 22 or the second insert embedded metal structure 24. Explosives may then be positioned on the flyer plate to explosion weld the second insert embedded metal structure 24 to the first embedded metal structure 22. The second metal structure 24 may also be deformed sufficiently to attach the inserts embedded within that structure to that metal structure. The flyer plate may then be removed, separated or moved away from the explosion welded components after the explosion welding or may be kept attached to a metal structure via an explosion weld formed between the flyer plate and that metal structure. It should be understood that additional layers of insert embedded metal structures may also be added via additional explosion placement and ignition steps as well to meet a particular design requirement or manufacturing objective.

After a wearable surface is formed on a crushing body, the crushing body may be cut to a desired shape or size. For example, electric discharge machining, water jet cutting mechanisms or other cutting mechanisms may be used to cut a crushing body or a wearable surface for attaching to a crushing body or grinding component. The cut surface or crushing body may also be bent, flattened, or otherwise machined to provide a desired shape, size or structural configuration for assembly required to form a desired crushing device or crushing mechanism of a crushing device. The formed structures may then undergo stress relief, such as a heat treatment. It should be appreciated that different structures that are formed from such cutting and other processing may then be attached together to form a crushing body, a wearable surface for a crushing body, or a wearable surface for a support used to support material being impacted by a crushing body such as, for example, an anvil, a table, or other support.

Referring to FIGS. 3, 4, 5 and 6, a cylindrical crushing body 31 may include a wearable surface that is defined by a first set of inserts 32, a second set of inserts 38, a third set of inserts 42 and a fourth set of inserts 46 attached to a metal tube or other metal structure. The inserts and metal tube of the crushing body 31 are attached together by the ignition of explosive material via an embodiment of any applicable method discussed above. Preferably, the inserts 32, 38, 42 and 46 are adhered within recesses formed in the metal tube prior to the attachment of the inserts to the metal tube to form a wearable surface on the crushing body 31 via the ignition of explosives adjacent to a flyer plate or drive tube. The wearable surface may be configured to be a semi-autogenous layer of the crushing body or to form a semi-autogenous layer after experiencing sufficient wear.

The first set of inserts 32 include insert members positioned in a first arrangement that extends along a first portion 34 of the crushing body 31. The insert members are harder than the metal tube of the crushing body. That first portion 34 is preferably about 25% of the outer surface of the crushing body, or 0 to 90 degrees around the outer circumference of the crushing body. Preferably, the first set of inserts are recessed about 0.5 inches below the outermost portion of the wearable surface of the crushing body 31.

The second set of inserts 38 include insert members positioned in a second arrangement that extends along a second portion 36 of the crushing body. The insert members are harder than the metal tube of the crushing body 31. That second portion 36 is also preferably about 25% of the outer surface of the crushing body 31, or from 90 to 180 degrees around the outer circumference of the crushing body. Preferably, the second set of inserts are recessed about 0.5 inches below the outermost portion of the wearable surface of the crushing body 31.

The third set of inserts 42 include insert members that are positioned in a third arrangement that extends along a third portion 40 of the crushing body. The insert members are harder than the metal tube of the crushing body 31. The third portion 40 is also preferably about 25% of the outer surface of the crushing body 31, or from 180 degrees to 270 degrees around the outer circumference of the crushing body. Preferably, the third set of inserts are recessed about 0.375 inches below the outermost portion of the wearable surface of the crushing body 31.

The fourth set of inserts 46 are positioned in a fourth arrangement that extends along a fourth portion 44 of the crushing body 31. The insert members are harder than the metal tube of the crushing body. The fourth portion 44 is preferably about 25% of the outer surface of the crushing body 31, or extends from 270 degrees to 360 degrees around the outer circumference of the crushing body 31. Preferably, the fourth set of inserts are recessed about 0.375 inches below the outermost portion of the wearable surface of the crushing body 31.

It should also be understood that the first, second, third and fourth arrangements of the inserts shown in FIGS. 3-6 may be similar arrangements or may each provide a different arrangement of inserts in different embodiments of the wearable surface of a crushing body.

Figure 7:
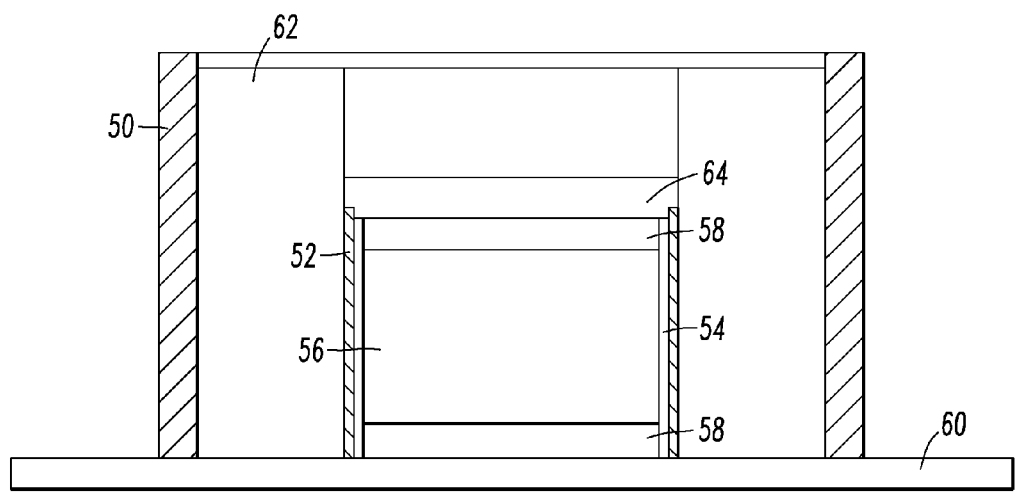
FIG. 7 is a cross sectional view of a first present preferred arrangement of metal structures, inserts and explosives for explosion welding inserts to a metal structure.

A wearable surface that contains the multiple arrangements of inserts may be formed by explosion welding as may be appreciated from FIG. 7. A metal structure 56 may include inserts embedded in the metal structure 56. The inserts may be embedded by drilling holes into the metal structure and placing the inserts within those holes. The inserts may also be adhered within the metal structure 56 to help position the metal inserts.

The metal structure 56 may be positioned on risers 58 supported by a support 60 for maintaining the metal structure at a desired position. A flyer tube 52 composed of metal may be positioned adjacent to the insert embedded metal structure 56. The flyer tube may be positioned such that there is a gap 54 between the metal structure 56 and the flyer tube 52. The gap 54 may be maintained by spacers positioned between the flyer tube 52 and the metal structure 56. The width of the gap may define a standoff distance.

The standoff distance may be, for example, between 0.125 inches and 0.875 inches. A velocity of detonation created via ignited explosive material may be for example, between 1,800 m/s to 3,600 m/s or between 1,800 m/s and 7,000 m/s. It should be understood that the standoff distance and the velocity of detonation define the impact velocity between the different metal structures that occurs.

It is contemplated that alternative embodiments of the method may utilize other standoff distances or other velocity of detonations. For example, a standoff distance of between 0.0625 inches and 1.25 inches may be used and a velocity of detonation below 1,800 m/s or above 3,600 m/s may be used. The utilization of a particular standoff distance and velocity of detonation may be adjusted to provide a desired impact velocity for meeting a desired design objective or manufacturing objective.

A metal cap structure 64 may be positioned over the metal structure 56 and any riser positioned on the metal structure 56. If the metal structure is a tube, pipe or other structure that may include a channel, that channel may be filled by a plug structure (not shown in FIG. 7). Another tube 50 may be provided around the flyer tube 52. This tube 50 may include foam positioned between the outer diameter of the tube and the flyer plate 54. The tube 50 may be positioned to retain explosives. An explosive powder 62 may be positioned adjacent to the flyer tube 52 and positioned adjacent to the cap structure 64. A portion of the explosive powder may contact the flyer tube 52 and the cap structure 64.

The explosive powder may be composed of different combinations of explosive material. For example, the explosive powder may be composed of ammonium nitrate, amatol, guanidine, dynamite, cyclonite, ANFO, type EL819 explosive material, type T200 explosive material, or other explosive materials or any combination thereof. The explosive powder may be obtained from any authorized supplier or vendor of such material. Of course, the explosive may be an explosive material that is not in a powder form in alternative embodiments.

The explosive powder 62 may then be ignited at a top central location to cause the flyer tube 52 to progressively crimp the flyer tube from the top of the flyer tube to the bottom of the flyer tube such that the flyer tube contacts and engages the outer surface of the metal structure 56 to deform a portion of the metal structure 56 to cover at least a portion of the inserts embedded within the metal structure 56. Preferably, the inserts are recessed within the outer surface of the metal structure 56 and a portion of the metal structure 56 is deformed such that the inserts are fully encapsulated within the metal structure 56 after the explosive powder 62 has been completely ignited or at least sufficiently encapsulated to provide an adequate attachment of the inserts to the metal structure 56. Thereafter, the flyer tube 52 may be cut to aid the removal of the flyer tube 52 away from the metal structure 56 and inserts attached therein or thereto via the deformation of the portion of the metal structure 56. To the extent a plug 171 was used, the plug may also be removed from any aperture of the metal structure 56 in which the plug was placed. Alternatively, it is contemplated that the flyer tube 52 may remain attached to the metal structure 56.

It should be appreciated that the impact velocity and the amount of momentum that may be transferred from the flyer tube 52 to the metal structure 56 via the ignited explosive material is increased by increasing the width of the gap 54, of increasing the standoff distance. Similarly, the amount of the impact velocity and momentum that may be transferred may be decreased by decreasing the width of the gap 54, or decreasing the standoff distance. The width of the gap may be selected to meet a particular design objective to ensure that a desired amount of force is transferred from the ignited explosive material to the metal structure 56. Additionally, the mass of explosive material used may also be adjusted in combination with the gap width so that a desired amount of force is transferred from the ignited explosive material to the metal structure 56. It should be appreciated that the desired amount of force may be different depending on the material properties of the inserts and metal structures used and the design objectives for the formed wearable surface.

Figure 7A:
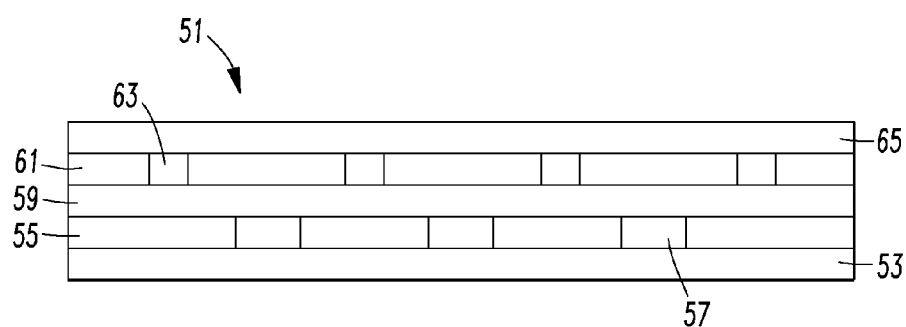
FIG. 7A is a fragmentary side view of a present preferred embodiment of a crushing body that includes a present preferred embodiment of a wearable surface after being explosion welded together.

Referring to FIG. 7A, a wearable surface 51 may be formed on a crushing body that is comprised of multiple layers of insert embedded metal structures. The layers of the wearable surface 51 may include a first insert embedded layer 55 that includes inserts 57 in a first alignment and a second insert embedded layer 61 that includes inserts 63 in a second alignment. The wearable surface may be formed by positioning the layers 53, 55, 59, 61, and 65 in their respective positions and then explosion welding the layers together to form the wearable surface 51 or by attaching subsequent layers together in separate explosion welding shots or explosion welding steps. It is contemplated that the first insert embedded layer 55 may be a portion of a crushing body, such as a die for a crusher or a roller for a mill roller or may be a surface of a support such as an anvil of a mill or a wear surface of a bowl in a cone crusher.

Each insert embedded metal structure may be defined by a metal structure such as a metal plate, a metal cylindrical structure or a metal structure that has a particular desired shape or size. It should be understood that a metal cylindrical structure may include, for example, a metal roller, a metal tube, a metal pipe, or a metal disc.

Each insert embedded layer is a metal structure that includes inserts embedded therein. The inserts may be embedded in each insert embedded layer by being positioned within recesses formed in the layer and by being affixed to the layer by an adhesive such as a mortar or a cement. The recesses may be formed by drilling holes into the metal structure sized to receive the inserts. It should be appreciated that while an adhesive may help position the inserts within a metal structure, the adhesive will generally not attach the insert to the metal structure sufficiently for the inserts to stay attached to the metal structure if that metal structure were to be used as a wearable surface for crushing material.

Preferably, the first alignment of the inserts in the first insert embedded layer 55 is arranged such that they are offset relative to the inserts in the second insert embedded layer 61. The staggered arrangement can provide a present preferred crushing profile for the crushing body. It should be understood that alternative embodiments of the wearable surface 51 of a crushing body may include additional layers of embedded insert layers and base layers.

After the wearable surface 51 is formed, the wearable surface 51 may be cut by a cutting mechanism such as electronic discharge machining or water jet cutting into a desired shape. For instance, a wearable surface may be cut to form a shape for being attached to a liner or bowl of a cone crusher or a material engaging portion of a crushing die of a mill. As another example, the wearable surface 51 may be cut into different pieces for being attached around a roller for a roller mill. It should be understood that the cut pieces may be used to retrofit the crushing body of a crushing device with a new wearable surface formed from those cut pieces while the crushing body is included in a crushing device positioned for manufacturing or within a product line.

Figure 8:
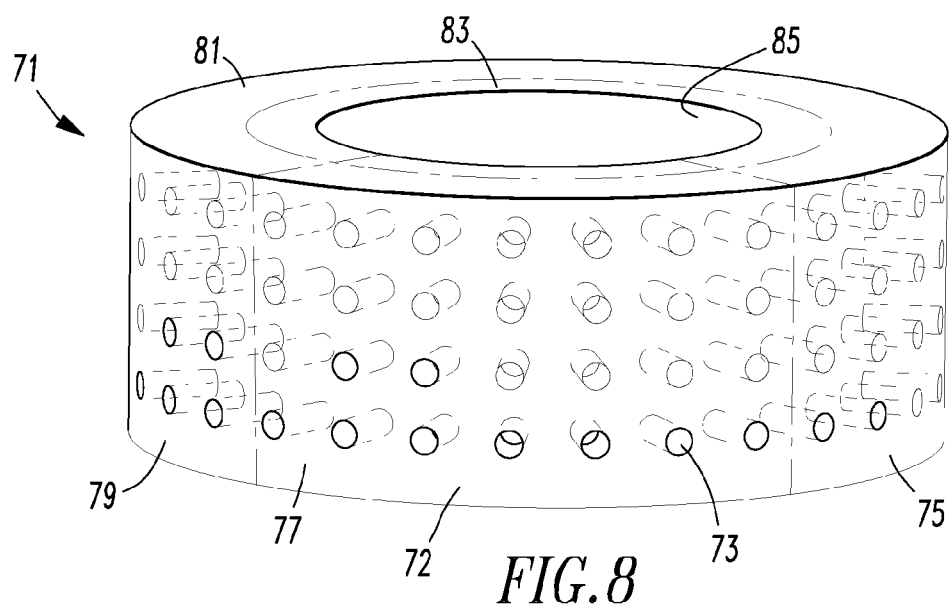
FIG. 8 is a perspective view of a first present preferred crushing body that may be used in a first present preferred embodiment of a crushing device.

Referring to FIG. 8, a first present preferred crushing body 71 includes a wearable surface 72 that has a plurality of portions 75, 77 and 79. The crushing body 71 is preferably a generally cylindrical structure such as a tubular structure. The first portion 75 may extend from 0 degrees to 120 degrees around the outer circumference of the crushing body 71, the second portion 75 may extend from 120 degrees to 240 degrees around the outer circumference of the crushing body 71 and the third portion 79 may extend from 240 degrees to 360 degrees around the outer circumference of the crushing body 71. Each portion may be separately formed and connected together. For such an embodiment, each portion may have had inserts embedded therein and subsequently attached via deformation caused by igniting explosives utilizing an embodiment of a method discussed above. Alternatively each portion may be a portion of an integral structure that had inserts embedded therein that was subsequently attached via deformation caused by igniting explosives utilizing an embodiment of a method discussed above.

The crushing body 71 includes a central channel 85. An inner portion 83 of the crushing body may be adjacent to the central channel 85. The inner portion 83 is integral to a wearable surface portion 81, or outer portion, of the crushing body 71.

Figure 9:
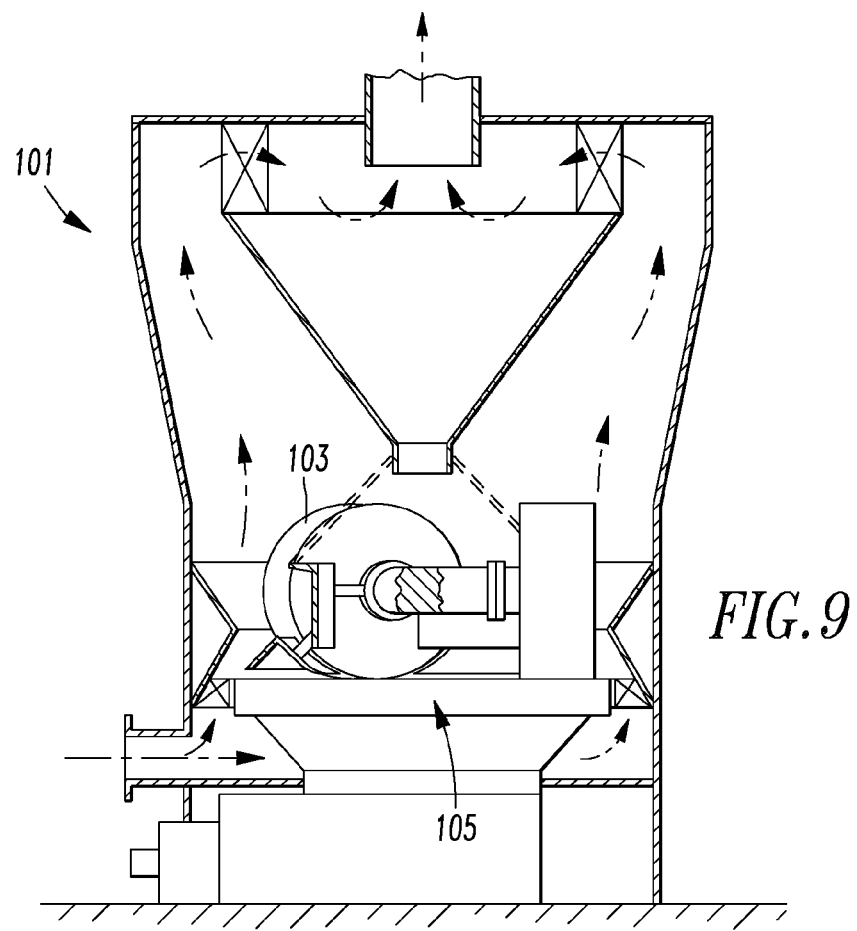
FIG. 9 is a diagrammatical elevation view of a first present preferred embodiment of a crushing device.
Figure 13:
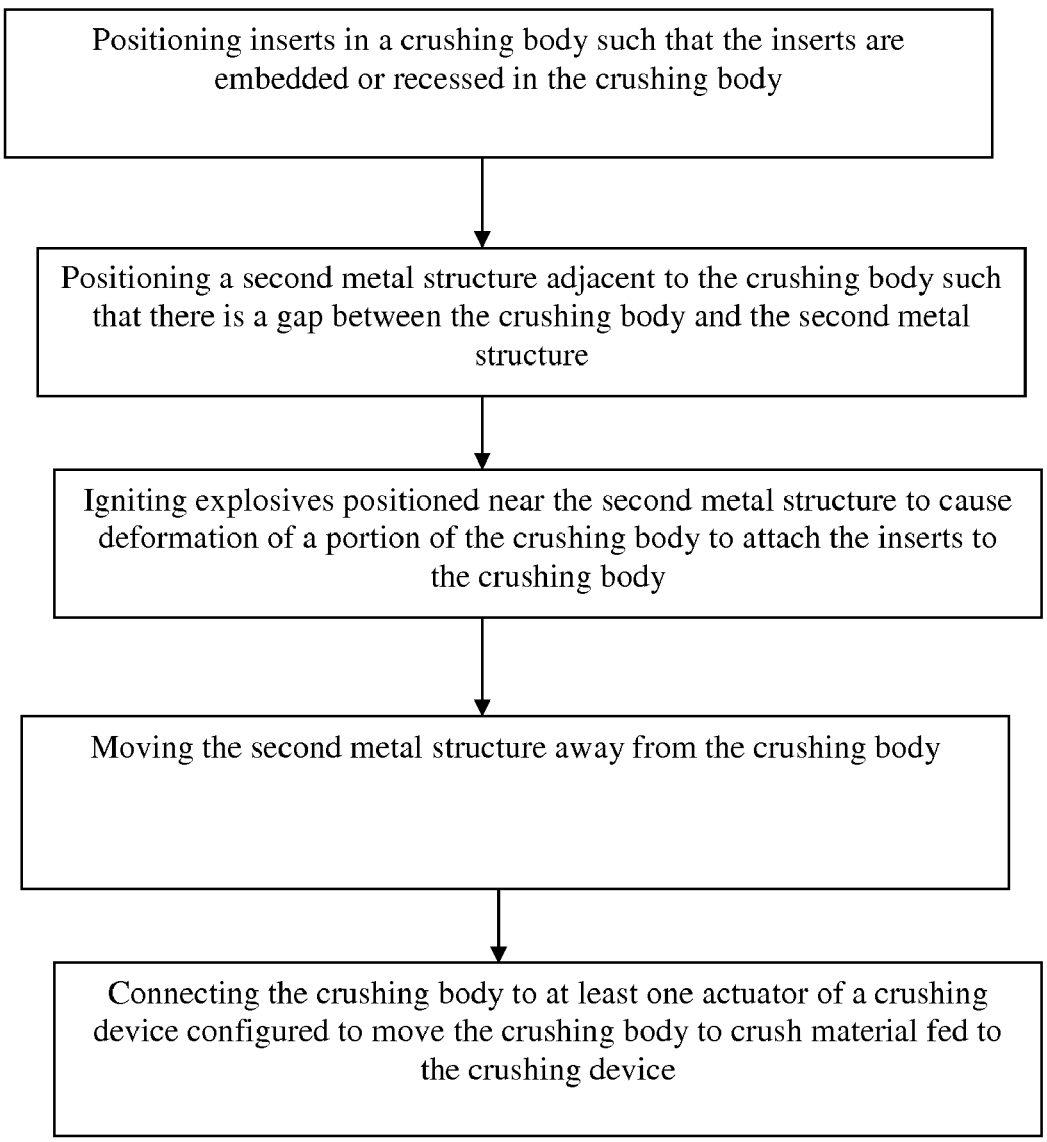
FIG. 13 is a flow chart illustrating a present preferred method of making a crushing device.

Referring to FIG. 9, a roller mill 101 may include a roller 103 that has a wearable surface formed by using any of the methods discussed above or may be structured as described above. The roller mill 101 may also have been created utilizing the method shown in FIG. 13.

The wearable surface of the roller 103 may be formed by attaching inserts to a first metal structure together via the ignition of explosives to cause a transfer of force sufficient to deform the first metal structure to engage a portion of the surface area of the inserts for attaching the inserts to the metal structure. The roller 103 may include, for example, the crushing body 71 shown in FIG. 8 and described above. The roller 103 may be configured to move adjacent to a surface 105. The surface 105 may be stationary or may be configured to move. The surface 105 may also be formed by attaching inserts to a metal structure together via the ignition of explosives to cause a transfer of force sufficient to deform the metal structure to engage the inserts for attaching the inserts to the metal structure as may be appreciated from the methods discussed above.

Figure 10:
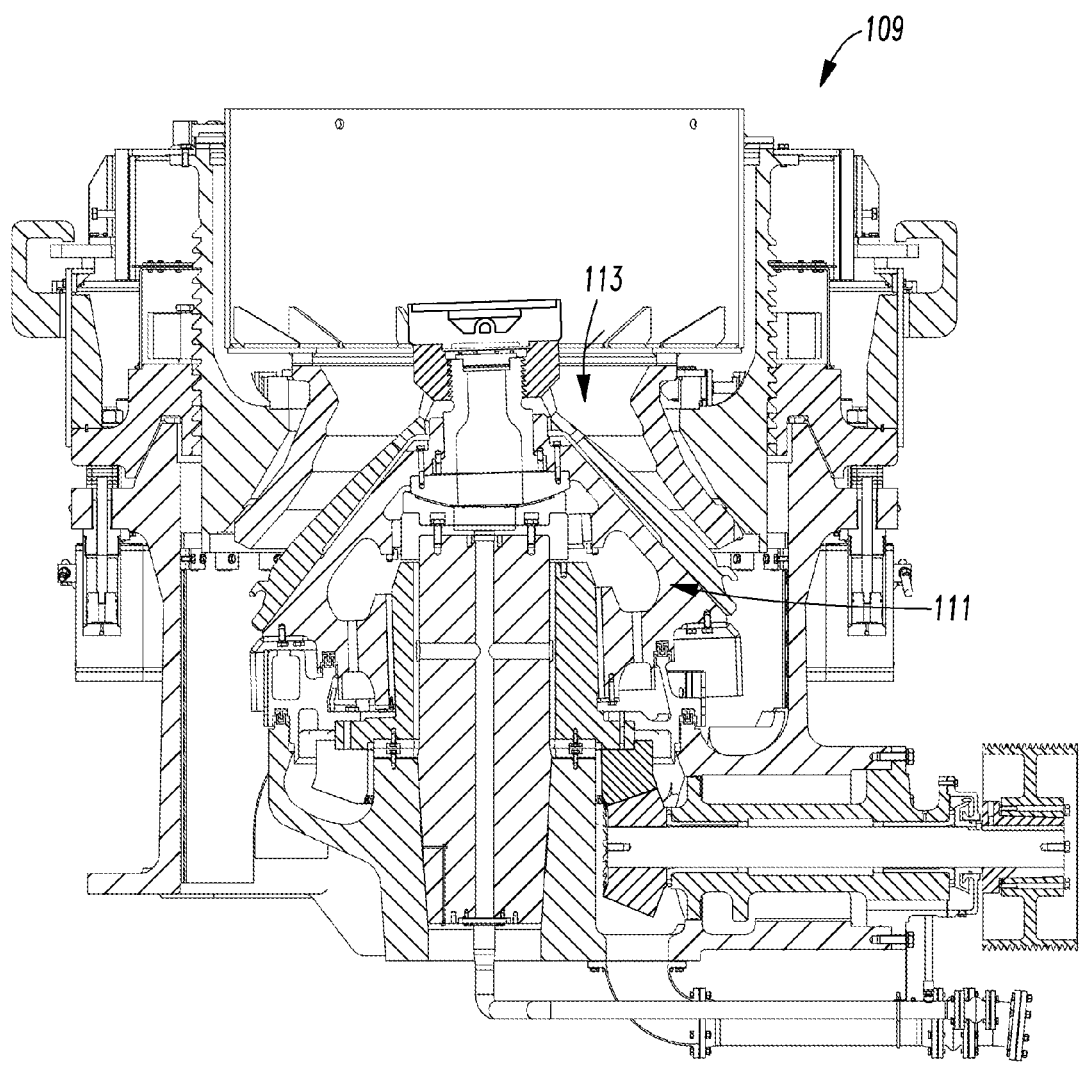
FIG. 10 is a cross sectional view of a second present preferred embodiment of a crushing device.
Figure 12:
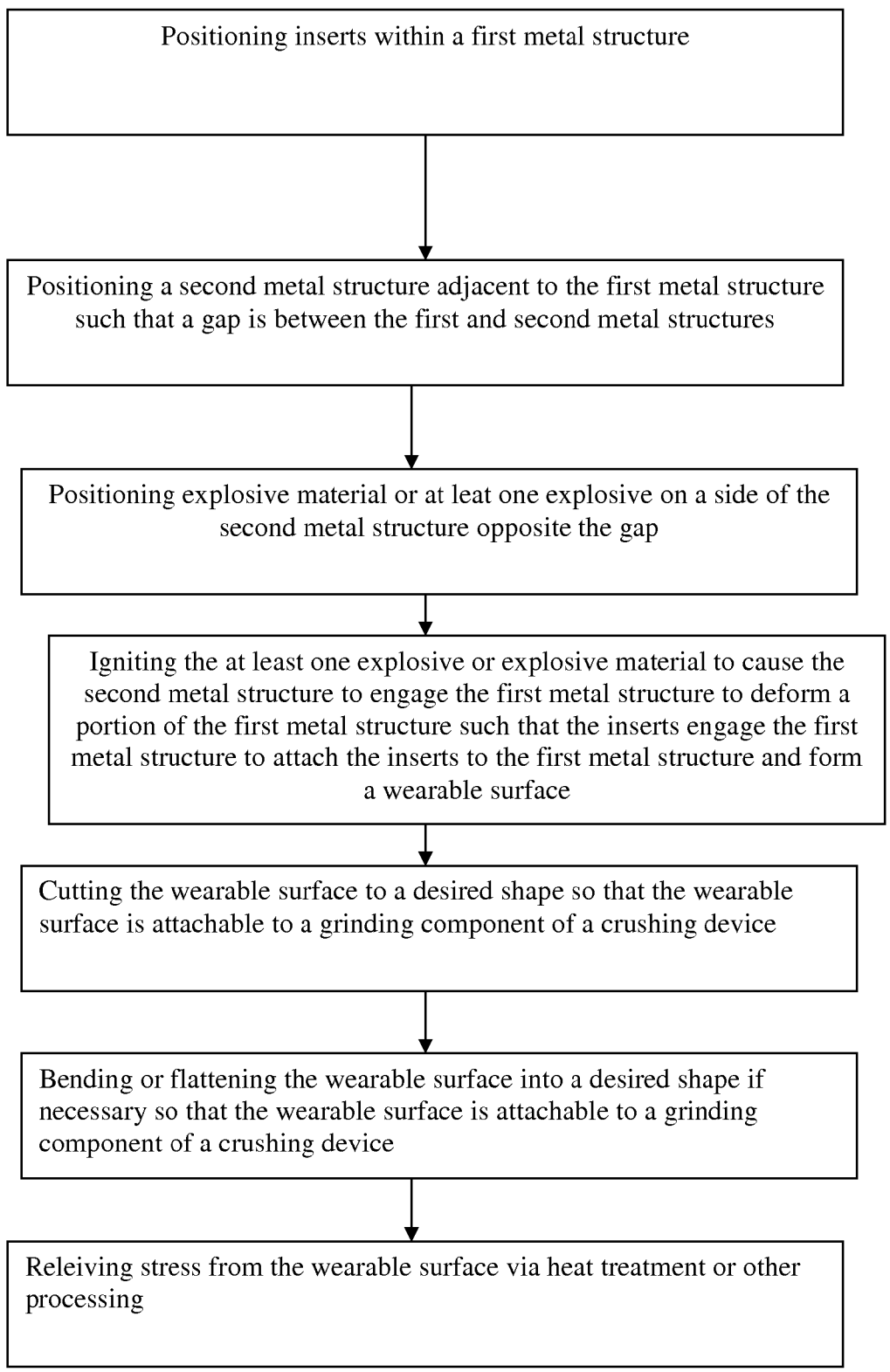
FIG. 12 is a flow chart illustrating a present preferred method of making a wearable surface.

Referring to FIG. 10, a cone crusher 109 may include a crusher head 111 and a bowl 113. The crusher head may move to crush material between the crusher head and the bowl. The bowl or a liner on the crusher head may include a wearable surface formed as described above or by the method shown in FIG. 12. For instance, the liner of the crusher head or the bowl may include a wearable surface that is formed by attaching inserts to a metal structure together via the ignition of explosives to cause a transfer of force sufficient to deform the metal structure to engage the inserts for attaching the inserts to the metal structure as may be appreciated from the methods discussed above. It should be appreciated that such a formed structure may be cut or bent or otherwise processed to form the wearable surface of the bowl or liner.

Figure 11:
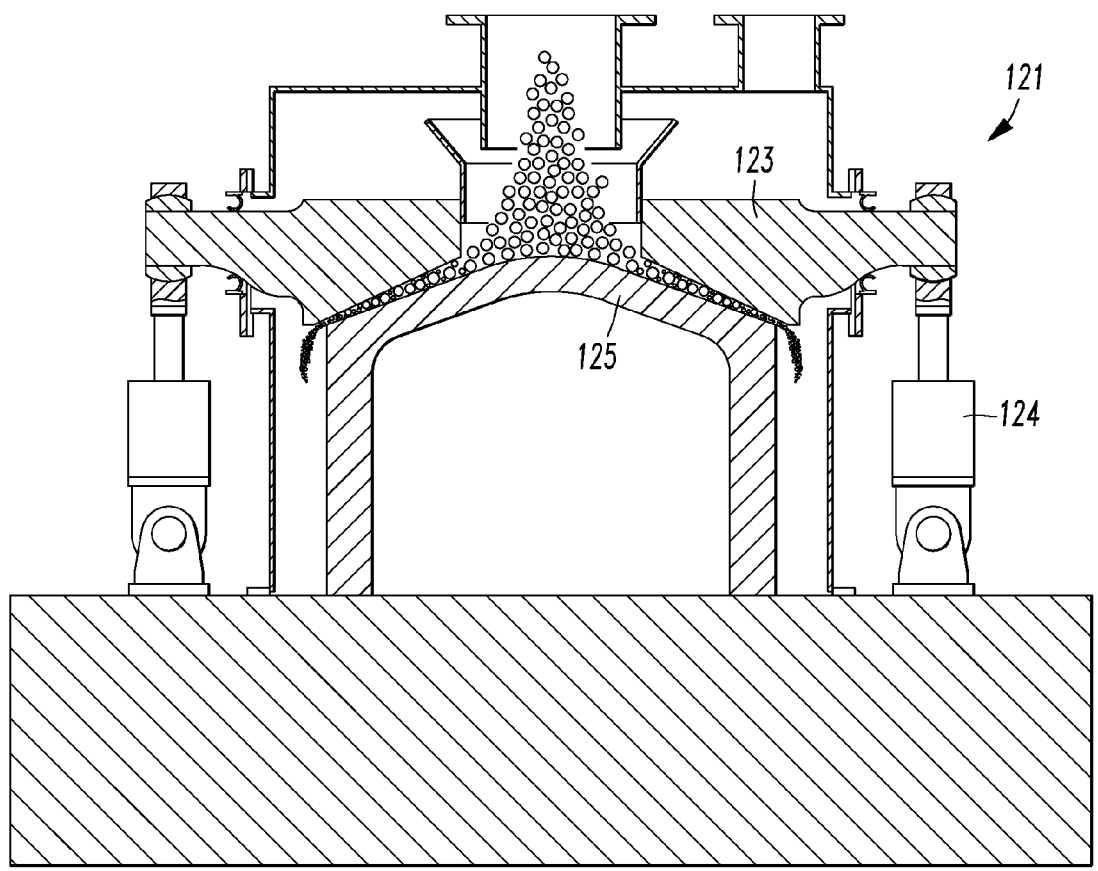
FIG. 11 is a cross sectional view of a third present preferred embodiment of a crushing device.

Referring to FIG. 11, a crushing device 121 may include a die 123 that is attached to actuators 124 that are configured to move the die 123 vertically or linearly to crush material positioned between the die 123 and a table 125, or anvil. In some embodiments of the crushing device 121, the table 125 may be a conveyor belt or a moveable surface. The surface of the table 125 or the crushing surface of the die 123 may include a wearable surface attached thereto as described above. For example, the crushing surface of the die 123 may include a wearable surface formed by attaching inserts to a metal structure via the ignition of explosives to cause a transfer of force sufficient to deform the metal to engage the inserts for attaching the inserts to the metal structure as may be appreciated from the methods discussed above. The surface of the table 125 may also include such a wearable surface. For instance, the wearable surface of the table 125 or the die 123 may be formed by explosion welding different insert embedded layers together in separate explosion welding shots or in one explosion welding shot as discussed above.

Figure 14:
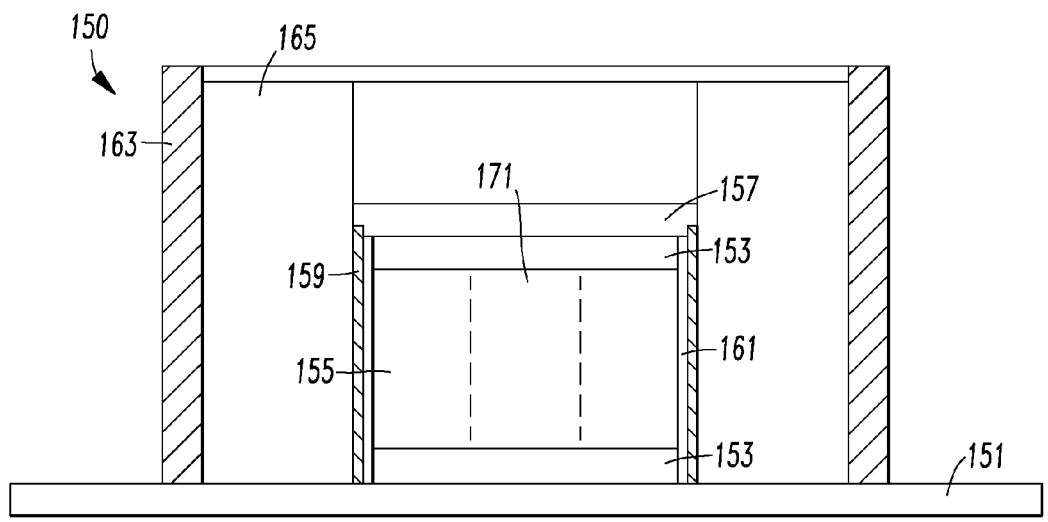
FIG. 14 is a cross sectional view illustrating a second present preferred arrangement of metal structures, inserts and explosives for attaching inserts to the metal structure. A center plug that may be positioned within a central channel of the metal structure is shown in dotted line in FIG. 14.

Testing was also conducted of different wearable surfaces formed from the methods discussed above. For example, a test for explosion welding inserts to a cylindrical metal structure was performed. The testing utilized an assembly 150 as shown in FIG. 14. The assembly 150 included an anvil, or base 151 that supported other elements of the assembly for attaching the inserts to a metal cylindrical structure via deformation of a portion of that metal cylindrical structure. The anvil 151 had a dimension of two inches by fifty-four inches by sixty inches. Riser plates 153, which each had a two inch height and 17.75 inch diameter, were positioned above and below the metal cylindrical structure 155, which was composed of grade 4140 steel. The metal cylindrical structure 155 had an outer diameter of 17.75 inches and was 10.5 inches in height, or length. The metal cylindrical structure 155 was tubular and also had an inner diameter of about 9.5 inches. Carbide disc inserts that were forty millimeters by forty millimeters were positioned within the metal cylindrical structure 155. The carbide inserts were harder than the metal of the metal structure 155 and were positioned so that the entirety of each carbide insert was recessed within the metal structure and an outer end of each carbide was visible, or uncovered by the outer diameter portion of the metal cylindrical structure 155. A cap plate 157 was positioned above the upper riser plate 153. The cap plate was two inches in height and had an outer diameter of twenty inches and included a step for receiving an upper portion of a drive pipe 159 having an internal diameter of 18.8 inches. The driver pipe 159 was positioned adjacent to the metal cylindrical structure 155 such that a gap 161 was defined between the metal cylindrical structure 155 and the driver pipe 159, or fly tube. The drive pipe 159 was a twenty inch nominal pipe size (NPS) and was fifteen inches long. The driver pipe was composed of ASTM type A36 carbon steel and had a thickness of between 0.125 and 0.875 inches for different experiments. The metal cylindrical structure was composed of grade 4140 steel. For different tests, the gap had a width of 0.125 inches, 0.25 inches, 0.375 inches and 0.5 inches. The width of the gap defined the standoff distance.

A sono tube 163 composed of foam was positioned outside of the driver pipe 159. The sono tube 163 was positioned to retain at least a portion of explosive material 165 positioned adjacent to the drive pipe 159. Some of the explosive material 165 was also positioned above the cap plate 153. After the explosive material 165 was positioned, it was ignited to crimp the drive pipe sufficiently to deform the metal structure 155 such that a portion of the metal structure 155 engaged the inserts to attach the inserts to the metal cylindrical structure 155. The ignited explosives caused a portion of the metal cylindrical structure 155 to plastically deform to encapsulate the inserts. The ignition point for the ignition of the explosives was a top central location. The top central location for the testing was the central portion of the top surface of the explosive material located in the middle of the top surface.

An explosive load of between 5 and 35 pounds per square foot (lb/ft$^2$) was utilized for testing purposes. The explosive material was of the type EL819 and type T200. The explosive material was sufficient to provide velocity of detonation of between 1,800-3,600 m/s for different experiments. The explosives were ignited by a ring primer initiation system.

A second test setup was also utilized for running additional tests. The second test setup was similar to the one discussed above with reference to FIG. 14. However, a center plug 171, which is shown in dotted line in FIG. 14, was also included in this setup. The center plug 171 had a height of 10.5 inches and a diameter of 9.5 inches. The center plug 171 was sized and configured to fit within the inner channel of a metal cylindrical structure 155. Mortar was also applied to the inserts to position the inserts within holes formed in the outer diameter of the metal cylindrical structure.

An explosive load of between 5 and 35 pounds per square foot was utilized for testing purposes. The explosive material was sufficient to provide velocity of detonation of between 1,800-3,600 m/s. The explosive material was ignited by a ring primer initiation system. The ignition point for the ignition of the explosives for the second testing was a top central location. The top central location for the testing was the middle of the top surface of the explosive material.

Additional testing was also conducted using the testing setups discussed above with reference to FIG. 14. The conducted testing showed that the inserts could be firmly locked into a position after the ignition of the explosive material by deformation of the metal structure such that the inserts were mechanically interlocked, or attached to the metal structure. The testing also showed that the inserts could successfully and reliably be exposed to the significant forces transferred from the ignited explosive material without being significantly damaged as a result of the load applied to the inserts and the metal cylindrical structure from the ignited explosives and flyer tube.

Different insert configurations and sizes were also tested, such as tapered, conical, and cylindrical inserts. Further, different depths or recessed positions of inserts were tested. Inserts were positioned so that they were recessed between 0.25 inches and 0.5 inches below the outer surface, or outer diameter of the metal cylindrical structure. The results showed that the inserts were generally undamaged when positioned between 0.375 and 0.5 inches below the outer surface. When the inserts were positioned only 0.25 inches below the outer surface, many inserts were determined to have an ultrasonic indication identifying the insert as being removed from its position, being chipped, or being cracked. However, it is contemplated that use of explosive material that provides a sufficiently low impact momentum transfer may permit the use of inserts positioned at 0.25 inches below the outer surface. It is also contemplated that recess depths of greater than 0.5 inches may be used. Indeed, conducted testing suggests that greater depths may be applicable. For example, a depth of 0.625 inches, 0.75 inches, 0.875 inches and 1.0 inches may be used for the inserts in some applications.

It is also contemplated that the velocity of detonation may be desired to be below 1,800 m/s or above 3,600 m/s for certain applications. For instance, such a velocity of detonation may be created by using more explosive material or less explosive material. As another example, the standoff distance between a driver pipe or flyer plate and an insert embedded structure may be increased to increase the impact velocity or may be decreased to decrease the impact velocity.

The testing results were very surprising. Prior to the present invention, it was previously believed that inserts may not be able to undergo the substantial forces that occur from igniting explosives because such forces would crack or damage the insert members. Testing was nevertheless conducted due to an inventive conception that believed such thinking was wrong. The testing showed that the insert members could experience such forces without being damaged.

Figure 15:
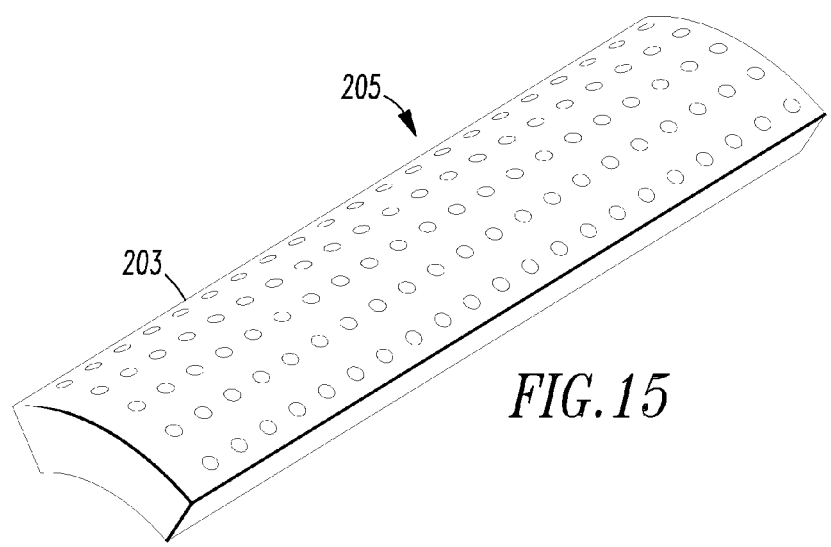
FIG. 15 is a perspective view of a present preferred segment of a wearable surface.
Figure 16:
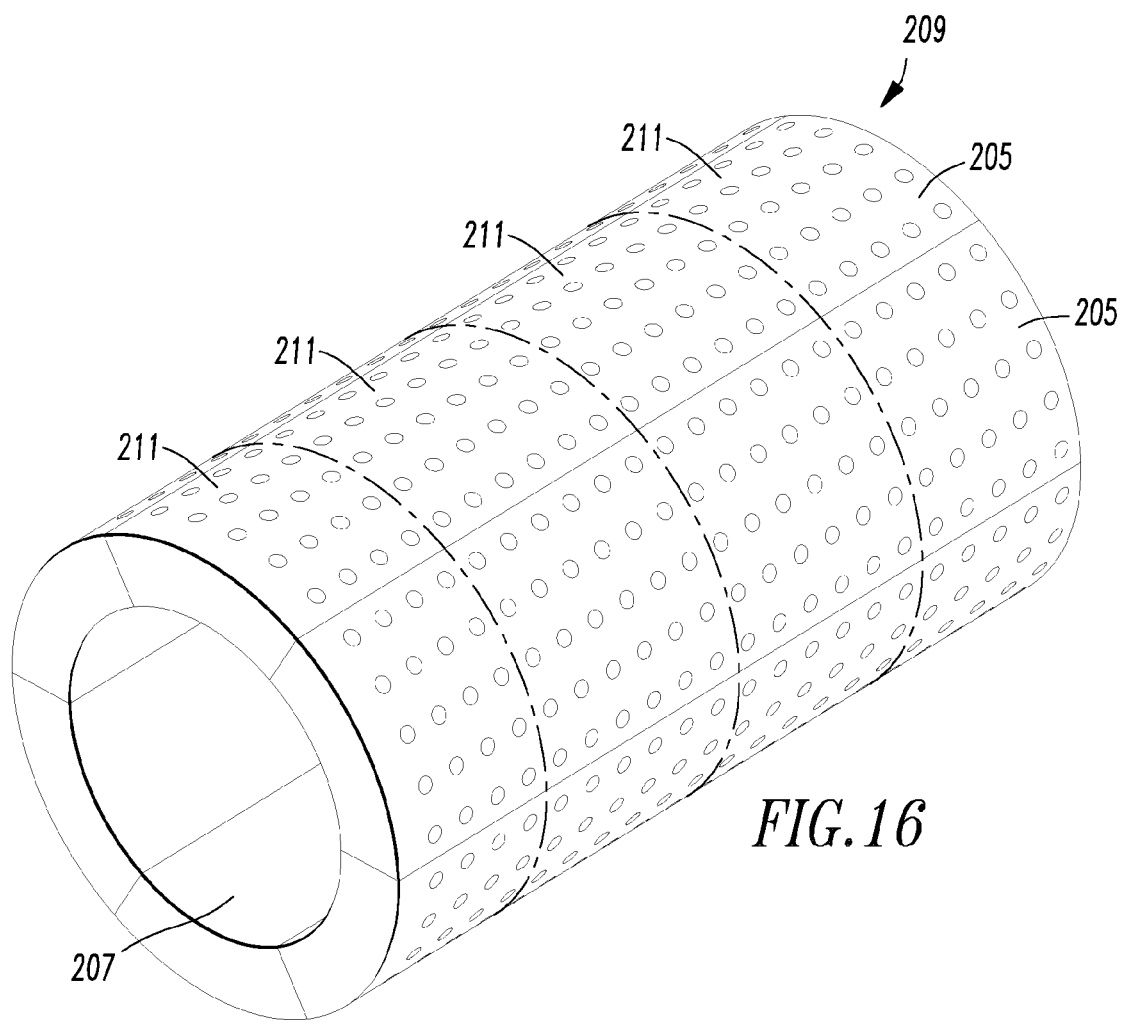
FIG. 16 is a perspective view of a present preferred crushing body that has a wearable surface.

Embodiment of the method of making wearable surfaces may also be used for retrofitting or repairing wearable surfaces. Referring to FIGS. 15 and 16, a crushing body 209 may have inserts 203 embedded therein and then may undergo a transfer of force from a driver pipe via ignited explosive material to deform a portion of the crushing body 209 to attach the inserts 203 to the crushing body. The crushing body 209 may then be cut into longitudinal segments 205 that extend along the longest dimension of the crushing body 209.

The metal structure may then be cut into a segment 205 that has a desired shape or size, as may be appreciated from FIG. 16. For example, electric discharge machining, water jet cutting mechanisms or other cutting mechanisms may be used to cut the metal structure to form the segment 205.

The segment 205 may be shaped and sized from the cutting to be a portion of a crushing body 209. The crushing body 209 may have a central channel 207 that is defined by interconnected segments 205. The segments may be interconnected via welding or other interconnection methods. If one of the segments 205 becomes damaged during crushing operations, a new segment 205 may be made and sent to a customer to replace the damaged segments.

As an alternative, the crushing body may be cut into lateral segments 211, which are shown in dotted line in FIG. 16. The lateral segments 211 extend along the diameter, or width, of the crushing body 209. Of course, the crushing body may also be cut in different shapes or sizes than those shown as lateral segments 211 or other segments 205.

A cut segment may then be attached to other segments to form a crushing body that has a desired shape or configuration or may be used to replace a portion of a crushing body or wearable surface provided to a customer that has become damaged.

It should be understood that each cut segment may undergo further processing, such as machining, finishing, or stress relief treatments prior to being attached to other segments or being used as a crushing body or a component of a wearable surface.

As will be understood by those of at least ordinary skill in the art, design parameters may change to meet a particular design objective for a product made from an embodiment of one or more of the methods discussed above. For example, the material properties of the metal of the metal structures and inserts being used may affect the desirable position of an insert within a metal structure or affect other aspects of the explosion welding process used to explosion weld the inserts to the metal structure. It is also contemplated that inserts may not be fully recessed from an outer surface of a metal structure and still be effectively attached to that structure. As another example, it is contemplated that the inserts may be recessed more than 0.5 inches or less than 0.25 inches into a metal structure and still be effectively attached to that structure to form a wearable surface applicable for crushing devices or other devices configured for comminution of material.

While certain present preferred embodiments of the wearable surfaces, devices that include such wearable surfaces and methods of making and using the same have been shown and described above, it is to be distinctly understood that the invention is not limited thereto but may be otherwise variously embodied and practiced within the scope of the following claims.

What is claimed is:

1. A method of making a wearable surface for a device configured for material comminution comprising:
    positioning inserts adjacent to a first metal structure, the inserts being harder than the first metal structure;
    positioning a second metal structure adjacent to the inserts and the first metal structure such that there is a gap between the second metal structure and the first metal structure, the second metal structure having a first side facing toward the gap and a second side opposite the first side;
    positioning at least one explosive adjacent to the second side of the second metal structure; and
    igniting the at least one explosive to deform a portion of the first metal structure to attach the inserts to the first metal structure to form the wearable surface.

2. The method of claim 1 wherein the inserts are first inserts and wherein the method is further comprised of the steps of:
    positioning second inserts adjacent to a third metal structure, the second inserts being harder than the third metal structure;
    positioning the third metal structure and the second inserts adjacent to the first metal structure such that there is a second gap between the first metal structure and the third metal structure; and
    wherein the igniting of the at least one explosive also deforms a portion of the third metal structure to attach the second inserts to the third metal structure and also forms a metallurgical bond between a portion of the third metal structure and a portion of the first metal structure to form the wearable surface.

3. The method of claim 1 further comprising moving the second metal structure away from the wearable surface; and
    wherein the first metal structure is a plate, a tube, or a generally cylindrical structure and the second metal structure is a plate, a tube, or a generally cylindrical structure and wherein the second metal structure is moved away from the wearable surface by at least one of cutting and hitting the second metal structure to move the second metal structure away from the wearable surface.

4. The method of claim 1 further comprising at least one of cutting the wearable surface to a desired shape, bending the wearable surface into a desired shape, flattening the wearable surface into a desired shape, and testing the wearable surface, the at least one of cutting, bending, flattening and testing configured to permit the wearable surface to be attached to a grinding component of the device.

5. The method of claim 4 wherein the device configured for material comminution is a mill, a crusher, or a grinding mechanism and wherein the wearable surface is configured for attaching to the grinding component such that the wearable surface is able to impact material to crush the material.

6. The method of claim 4 wherein the wearable surface is a first wearable surface and the grinding component has a second wearable surface and wherein the first wearable surface is configured to permit the first wearable surface to be attached to a grinding component of a crushing device so that the first wearable surface is able to replace at least a portion of the second wearable surface of the grinding component while the device is positioned in a crushing circuit.

7. The method of claim 6 wherein the replacing of the second wearable surface of the grinding component occurs by retrofitting the grinding component with the first wearable surface.

8. The method of claim 1 wherein the inserts are comprised of a first set of inserts and a second set of inserts, the inserts of the first set of inserts being larger than the inserts of the second set of inserts, the inserts being positioned such that the first set of inserts are arranged in an alignment positioned adjacent to an alignment of the second set of inserts.

9. The method of claim 1 wherein the inserts are comprised of a first set of inserts, a second set of inserts, a third set of inserts and a fourth set of inserts, the first set of inserts being recessed at least 0.5 inches into the first metal structure, the second set of inserts being recessed at least 0.5 inches into the first metal structure, the third set of inserts being recessed at least 0.375 inches into the first metal structure, the fourth set of inserts being recessed at least 0.375 inches into the first metal structure, the inserts being recessed into the first metal structure prior to the explosion welding.

10. The method of claim 1 wherein the inserts are embedded in the first metal structure and are bonded to the first metal structure during the positioning of the inserts; and
    wherein a portion of the first metal structure covers the inserts after the igniting of the at least one explosive occurs; and
    wherein the wearable surface is configured to experience wear such that the wearable surface forms a semi-autogenous layer of the first metal structure after experiencing wear during comminution of material operations for a period of time.

11. The method of claim 1 wherein the first metal structure has a diameter and the second metal structure has a diameter, the diameter of the second metal structure being greater than the diameter of the first metal structure.

12. The method of claim 1 wherein the device is a roller mill, a cone crusher, or a mill and wherein the inserts are at least partially covered by a portion of the first metal structure after the igniting of the at least one explosive to deform the portion of the first metal occurs.

13. The method of claim 1 wherein the inserts are comprised of at least one of conical insert members, tapered insert members, spherical insert members, and cylindrical insert members.

14. The method of claim 1 wherein the material is agglomerated material, rock, stone, minerals, or ore and wherein the inserts are fully covered by a portion of the first metal structure after the igniting of the at least one explosive to deform the portion of the first metal structure occurs.

15. The method of claim 1 wherein the inserts are comprised of at least a first set of inserts and a second set of inserts, the first set of inserts being smaller than the second set of inserts, the second set of inserts being positioned within the first metal structure at a different depth than the first set of inserts.

16. The method of claim 1 wherein the at least one explosive is one of ammonium nitrate, dynamite, guanidine, amatol, cyclonite, plastic explosives, and explosive powder.

* * * * *